US012215817B2

(12) United States Patent
Keil et al.

(10) Patent No.: US 12,215,817 B2
(45) Date of Patent: Feb. 4, 2025

(54) SEISMIC PIPE JOINT

(71) Applicant: Northwest Pipe Company, Vancouver, WA (US)

(72) Inventors: Brent Keil, Draper, UT (US); Spyridon Karamanos, Volos (GR)

(73) Assignee: Northwest Pipe Company, Vancouver, WA (US)

( * ) Notice: Subject to any disclaimer, the term of this patent is extended or adjusted under 35 U.S.C. 154(b) by 322 days.

(21) Appl. No.: 16/865,228

(22) Filed: May 1, 2020

(65) Prior Publication Data
US 2021/0041053 A1    Feb. 11, 2021

Related U.S. Application Data

(60) Provisional application No. 62/884,638, filed on Aug. 8, 2019.

(51) Int. Cl.
*F16L 57/02*    (2006.01)
*F16L 13/02*    (2006.01)

(52) U.S. Cl.
CPC ........... *F16L 57/02* (2013.01); *F16L 13/0209* (2013.01); *F16L 2201/20* (2013.01)

(58) Field of Classification Search
CPC ......... F16L 13/0209; F16L 13/04; F16L 9/06; F16L 9/047; F16L 13/02; F16L 57/02; F16L 2201/20
See application file for complete search history.

(56) References Cited

U.S. PATENT DOCUMENTS

| | | | | |
|---|---|---|---|---|
| 1,670,023 A | * | 5/1928 | Crouch | F16L 51/022 285/301 |
| 1,837,103 A | * | 12/1931 | Betz | F16L 13/04 285/229 |
| 1,872,271 A | * | 8/1932 | Furrer | F16L 13/0209 219/137 R |
| 3,222,441 A | * | 12/1965 | Schlein | E04D 13/08 264/249 |
| 3,342,512 A | * | 9/1967 | Pellizzari | F16L 43/001 285/183 |
| 3,847,186 A | * | 11/1974 | Bauer | F16L 9/06 138/173 |

(Continued)

FOREIGN PATENT DOCUMENTS

| | | | | |
|---|---|---|---|---|
| DE | | 436872 C | * 11/1926 | .......... F16L 13/0209 |
| DE | | 553388 C | * 6/1932 | |

(Continued)

OTHER PUBLICATIONS

Translation of FR680633A (Year: 1930).*

(Continued)

*Primary Examiner* — Zachary T Dragicevich
*Assistant Examiner* — Alexander T Rufrano
(74) *Attorney, Agent, or Firm* — Klarquist Sparkman, LLP

(57) ABSTRACT

A pipe joint has a first pipe having an end portion and a first pipe wall thickness, and a second pipe having an end portion. The end portion of the first pipe is welded to the end portion of the second pipe to seal the joint between the first pipe and the second pipe. The first pipe has an outwardly-extending, buckle-inducing deformation that is spaced apart from the pipe joint. A crest height of the deformation is 500% or less of the first pipe wall thickness.

18 Claims, 23 Drawing Sheets

(56) References Cited

U.S. PATENT DOCUMENTS

| | | | | |
|---|---|---|---|---|
| 4,257,155 | A | * | 3/1981 | Hunter .................. B21D 39/04 |
| | | | | 29/511 |
| 4,953,632 | A | * | 9/1990 | Sakaya ................ F28D 15/046 |
| | | | | 29/890.032 |
| 6,409,226 | B1 | * | 6/2002 | Slack .................... B21D 15/10 |
| | | | | 405/133 |
| 6,450,207 | B2 | | 9/2002 | Villatte et al. |
| 7,334,609 | B2 | * | 2/2008 | Petersen ................ F16L 27/11 |
| | | | | 138/30 |
| 9,205,475 | B2 | * | 12/2015 | Tajika ................ B21C 37/0803 |
| 9,869,410 | B2 | * | 1/2018 | Hasegawa ................ F16L 9/02 |
| 9,896,410 | B2 | | 2/2018 | Van Loo et al. |
| 10,267,440 | B2 | * | 4/2019 | Plattsmier ............ B23K 31/027 |
| 10,352,484 | B2 | * | 7/2019 | Blueml .................. B23K 1/002 |
| 2017/0102100 | A1 | | 4/2017 | Hasegawa et al. |
| 2017/0234463 | A1 | | 8/2017 | Plattsmier et al. |

FOREIGN PATENT DOCUMENTS

| | | | | |
|---|---|---|---|---|
| DE | 608015 | C | * | 1/1935 |
| DE | 645586 | C | * | 5/1937 |
| DE | 102004001109 | A1 | * | 8/2005 ............ F16L 13/142 |
| EP | 2818260 | A1 | | 12/2014 |
| FR | 680633 | A | * | 5/1930 |
| FR | 692900 | A | * | 11/1930 |
| FR | 771542 | A | * | 10/1934 |
| FR | 48205 | | * | 11/1937 .......... F16L 13/0209 |
| GB | 252692 | | | 9/1926 |
| GB | 252692 | A | * | 9/1926 |
| GB | 284865 | | | 2/1928 |
| GB | 330182 | | | 6/1930 |
| GB | 337463 | A | * | 11/1930 |
| KR | 20180086747 | A | * | 8/2018 .............. F16L 13/02 |

OTHER PUBLICATIONS

Translation of Specification of FR-771542 (Year: 1934).*
Translation of Claims of FR-771542 (Year: 1934).*
Extended European Search Report issued in EPC Application No. 20189802.0 on Jan. 21, 2021, 8 pp.
Hasegawa et al., "Development of 'Steel Pipe for Crossing Fault (SPF)' Using Buckling Pattern for Water Pipelines," *JFE Technical Report*, No. 19, pp. 61-65, Mar. 2014, 5 pgs.
Hasegawa et al., "Performance Test of Steel Pipe for Crossing Fault in United States," *The 10$^{th}$ JWWA/WRF/CTWWA Water System Seismic Conference*, Oct. 18-20, 2017, 10 pgs.
Trinkler, "In the Groove: Common Myths About Mechanical Pipe Joints," *Plant Services*, Mar. 31, 2010, retrieved on Nov. 1, 2019 from https://www.plantservices.com/articles/2010/04mechanicalpipejoints/.
Yano et al., "Seismic Design of High Pressure gas Pipeline Applying 'HIPER™'" *JFE Technical Report*, No. 19, pp. 66-70, Mar. 2014, 5 pgs.
McPherson et al., "Improving the Performance of Steel Pipe Welded Lap Joints in Geohazard Areas," Pipelines 2016, Kansas, MO, American Society of Civil Engineers: 1090-1101, Jul. 2016.
Office Action issued in related Mexican Application No. MX/a/2020/007813 by the Mexican Institute of Industrial Property on May 22, 2024, 5 pages (with English translation of Office Action, 4 pages).

* cited by examiner

S, Mises
SNEG, (Fraction = -1.0)
(Avg: 75%)
- · - 341.50    ——— 170.75
- — - 313.04    ········ 85.38
- - - - 256.13  — ·· — 56.92
                - ··· - 28.46

```
S, Mises
SNEG, (Fraction = -1.0)
(Avg: 75%)

-- -- -- -- --    540.08
-- -- -- -- --    395.41
- - - - - - -     347.18
----------        250.73
. . . . . . . .   202.51
................ 106.06
-- -- -- -- --    57.83
```

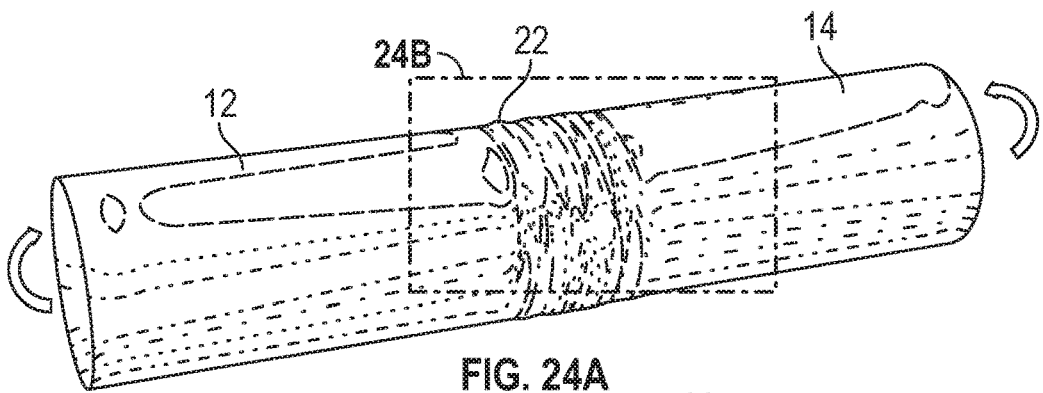
FIG. 24A
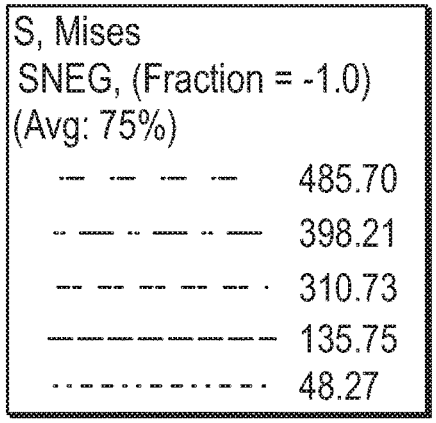
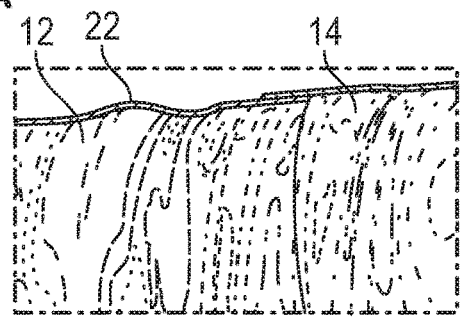
FIG. 24B
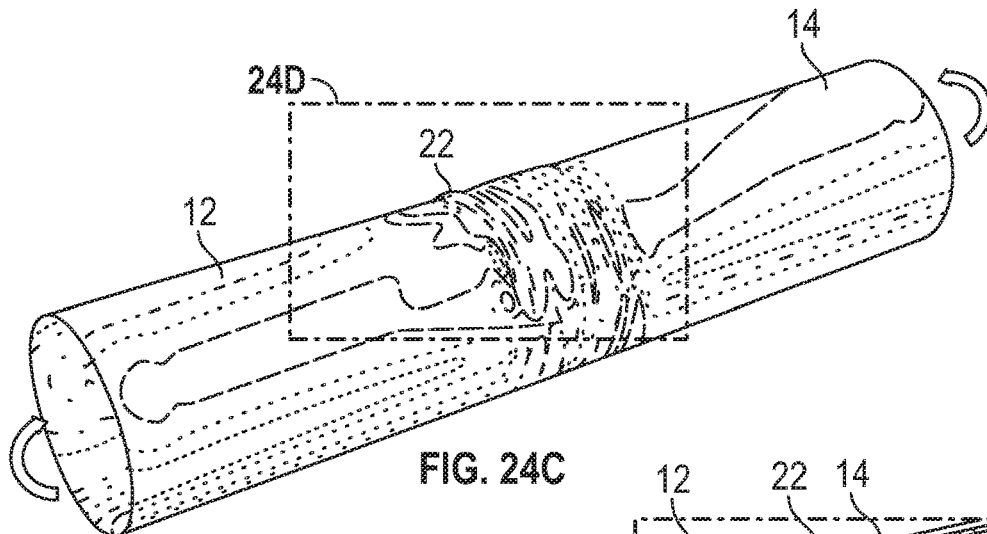
FIG. 24C
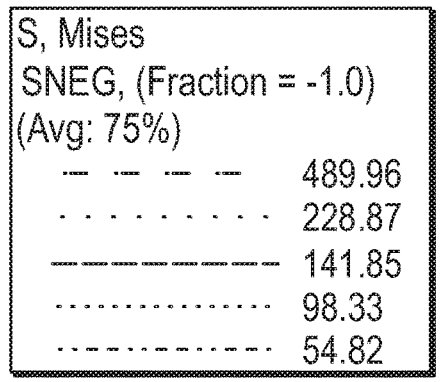
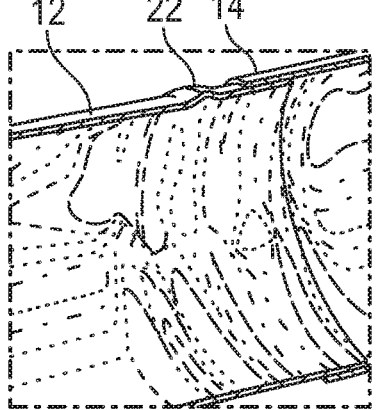
FIG. 24D

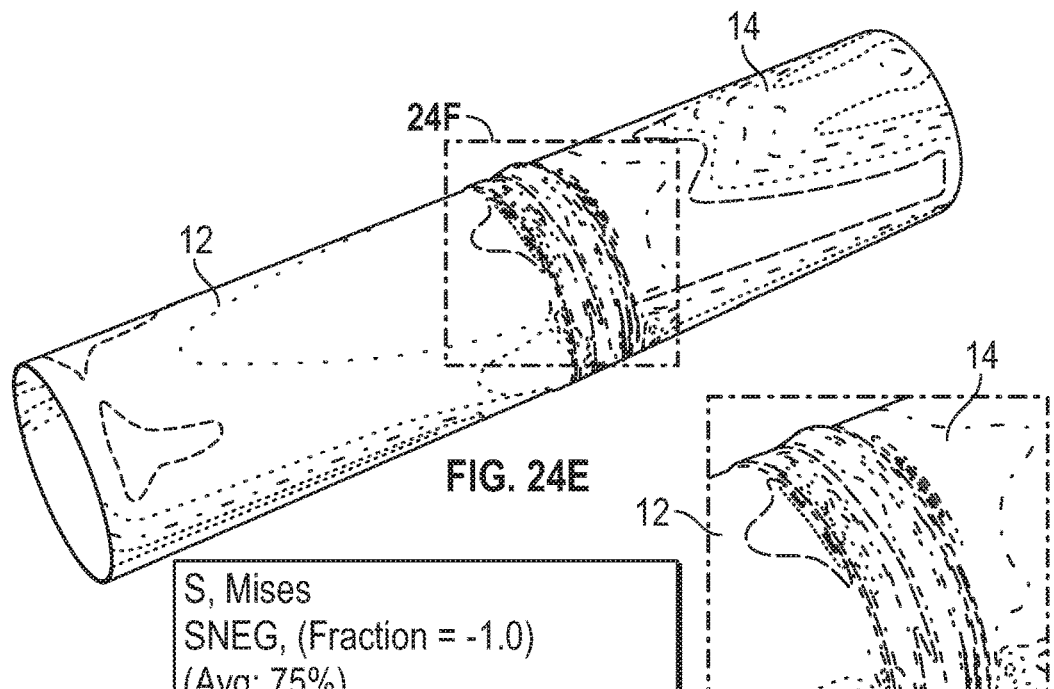
FIG. 24E
FIG. 24F
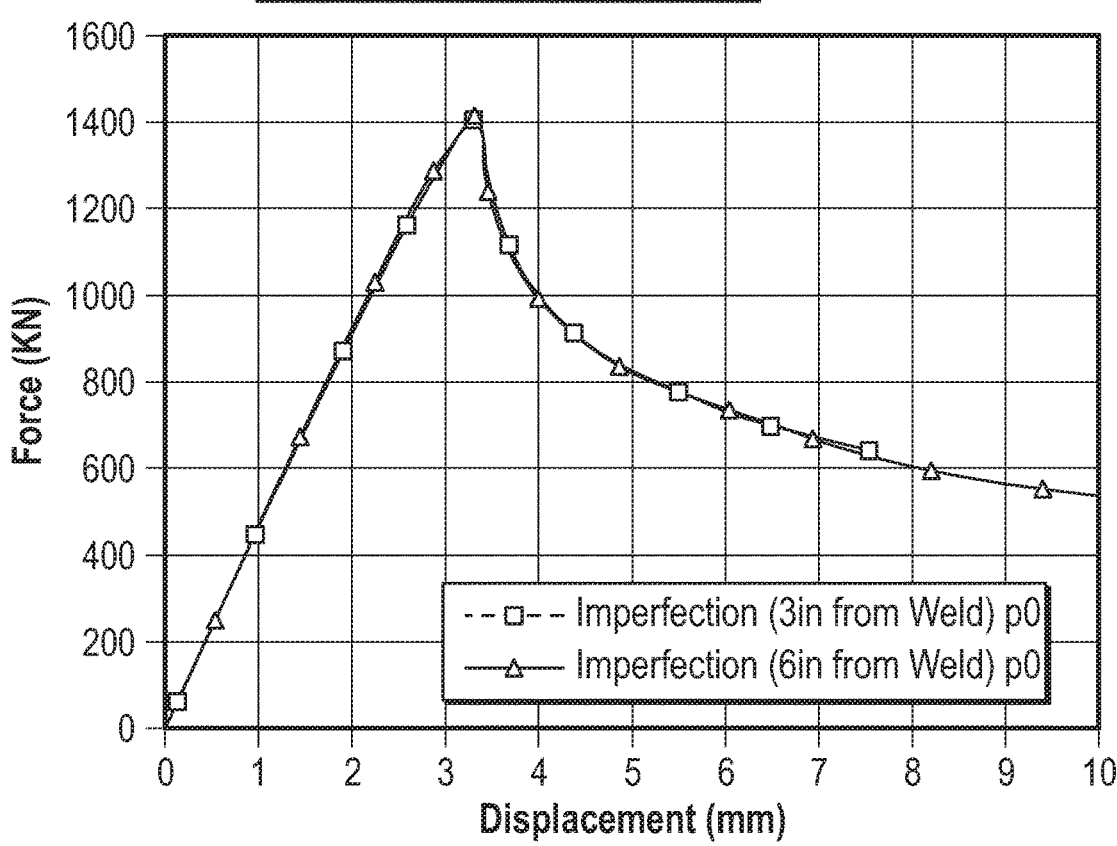
FIG. 25

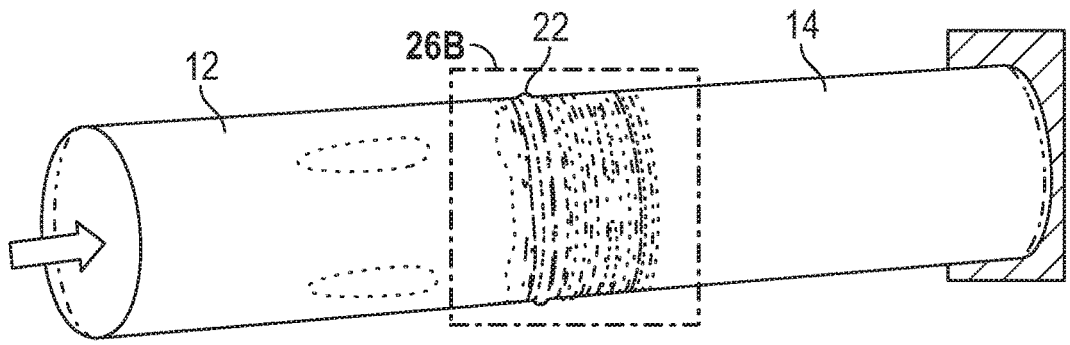
FIG. 26A
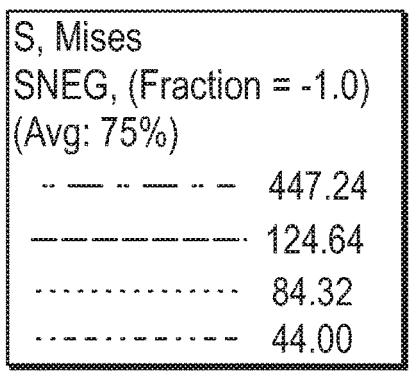
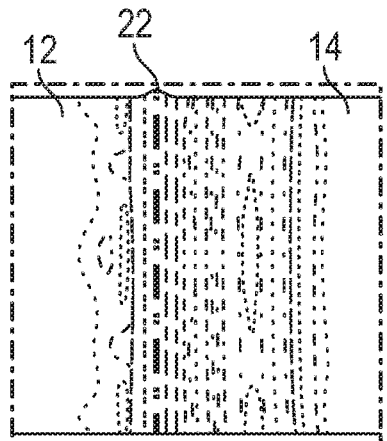
FIG. 26B
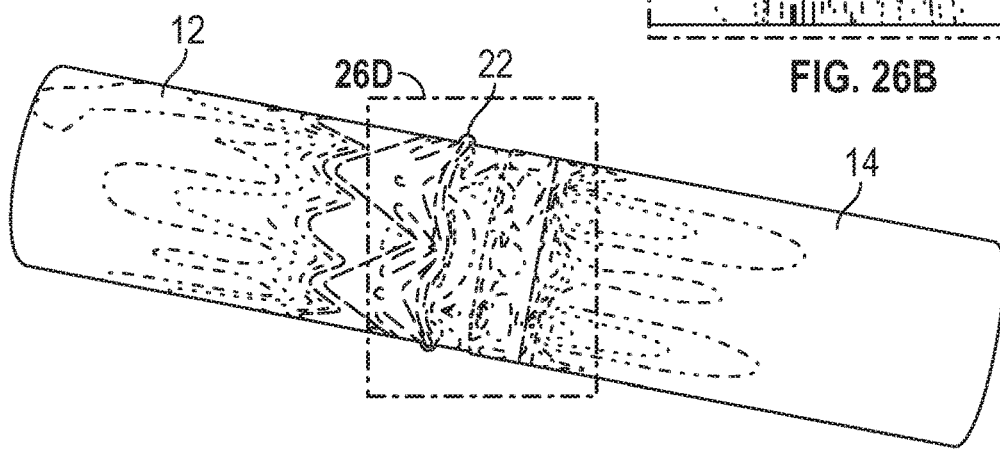
FIG. 26C
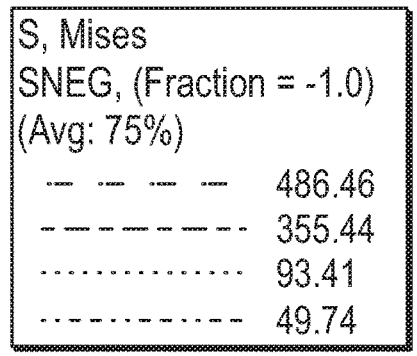
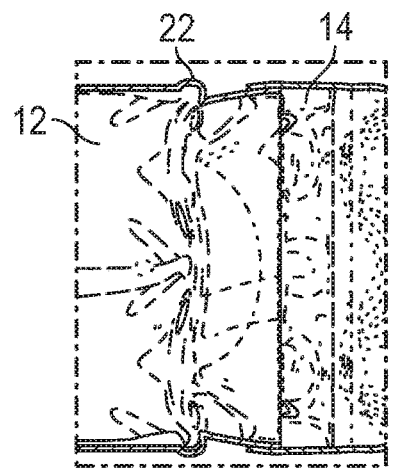
FIG. 26D

SEISMIC PIPE JOINT

CROSS REFERENCE TO RELATED APPLICATION

The present application claims the benefit of U.S. Provisional Application No. 62/884,638, filed Aug. 8, 2019. U.S. Provisional Application No. 62/884,638 is incorporated herein by reference in its entirety.

FIELD

The present disclosure concerns embodiments of pipes including features configured to induce buckling of the pipes at locations spaced apart from joints between the pipes during geohazard events such as seismic events or other stress-inducing events.

BACKGROUND

Existing joints between pipes in a pressurized pipeline, such as welded lap joints, can be prone to bending or buckling at the joint during geohazard or seismic events, such as at the bell of a first pipe that receives the spigot of a second pipe. The material at the welded connection of the bell of the first pipe to the spigot of the second pipe can be more prone to fracture, such as by hardening of the material during welding. This can increase the risk of failure and the loss of pressure containment during seismic and/or geohazard events, in which the pipes can be subjected to severe axial and/or bending loads. Accordingly, there exists a need for improvements to pipes and joints for pipelines.

SUMMARY

Certain embodiments of the disclosure pertain to pipes and pipe joints, wherein the pipes include deformations, protrusions, or projections formed in the pipes and configured to induce buckling of the pipes at the location of the deformations when subjected to severe loading conditions. In a representative embodiment, a pipe joint comprises a first pipe comprising an end portion and a first pipe wall thickness, and a second pipe comprising an end portion. The end portion of the first pipe is welded to the end portion of the second pipe to seal the joint between the first pipe and the second pipe. The first pipe comprises an outwardly-extending, buckle-inducing deformation that is spaced apart from the pipe joint, and a crest height of the deformation is 500% or less of the first pipe wall thickness.

In any or all of the disclosed embodiments, the deformation comprises an annular bulge formed in an exterior surface of the first pipe and an annular recess formed in an interior surface of the first pipe at the location of the annular bulge.

In any or all of the disclosed embodiments, the first pipe has a longitudinal axis and the deformation is symmetric about the longitudinal axis.

In any or all of the disclosed embodiments, the first pipe has a longitudinal axis, and the deformation is axially spaced from the pipe joint by 2 inches to 36 inches along the first pipe.

In any or all of the disclosed embodiments, the deformation is axially spaced from the pipe joint by 2 inches to 10 inches along the first pipe.

In any or all of the disclosed embodiments, the crest height of the deformation is from 50% to 300% of the first pipe wall thickness.

In any or all of the disclosed embodiments, the end portion of the first pipe is configured as a pipe spigot, the second pipe comprises a main body having a first diameter, and the end portion of the second pipe is configured as a pipe bell comprising a second diameter greater than the first diameter. The pipe spigot is inserted into the pipe bell and welded to the pipe bell.

In any or all of the disclosed embodiments, the crest height is from 80% to 100% of the pipe wall thickness.

In any or all of the disclosed embodiments, the pipe wall thickness is 0.135 inch and the crest height is 80% to 90% of the pipe wall thickness, or the pipe wall thickness is 0.25 inch and the crest height is 70% to 80% of the pipe wall thickness.

In any or all of the disclosed embodiments, a crest of the deformation does not extend beyond a height of an exterior surface of the second pipe.

In any or all of the disclosed embodiments, the pipe joint is a butt-welded pipe joint.

In any or all of the disclosed embodiments, the butt-welded pipe joint further comprises a reinforcing member disposed around the end portion of the first pipe and around the end portion of the second pipe, the reinforcing member being welded to the first pipe and to the second pipe. The second pipe comprises a buckle-inducing deformation formed in the end portion of the second pipe on the opposite side of the butt-welded pipe joint from the buckle-inducing deformation of the first pipe.

In any or all of the disclosed embodiments, the deformation of the first pipe is one of a plurality of buckle-inducing deformations formed in the first pipe and spaced apart from each other along a longitudinal axis of the first pipe.

In another representative embodiment, a method comprises welding the first pipe to the second pipe to form the pipe joint of any of the disclosed embodiments.

In any or all of the disclosed embodiments, the deformation is formed by positioning the first pipe over a plurality of dies of an expander apparatus, the first pipe being at ambient temperature, and each of the plurality of dies comprising a flange and a curved rod member coupled to a radially outward surface of the flange. The dies are moved radially outwardly from a central axis of the expander apparatus such that the rod members of the dies are pressed into an interior surface of the first pipe to form the deformation in the first pipe.

In any or all of the disclosed embodiments, the deformation is formed by positioning the first pipe between a first die and a second die of a grooving machine, the first pipe being at ambient temperature, the first die comprising a groove and the second die comprising a forming member. The first pipe is pressed between the first die and the second die, and the first pipe is rotated such that the forming member forms the deformation in the first pipe.

In another representative embodiment, a system comprises a first pipe comprising an end portion, and comprising a first pipe wall thickness, and a second pipe comprising an end portion configured to be joined to the first pipe. The first pipe comprises an outwardly-extending, buckle-inducing deformation that is spaced apart from the end portion of the first pipe such that when the first pipe is welded to the second pipe, the deformation is offset from the weld between the first pipe and the second pipe, and a crest height of the deformation is 500% or less of the first pipe wall thickness.

In any or all of the disclosed embodiments, the deformation is spaced from an end of the first pipe by 2 inches to 36 inches along the first pipe.

In any or all of the disclosed embodiments, the end portion of the first pipe is configured as a pipe spigot, the second pipe comprises a main body having a first diameter, and the end portion of the second pipe is configured as a pipe bell comprising a second diameter greater than the first diameter. The deformation is spaced apart from the pipe spigot such that when the pipe spigot of the first pipe is received in the pipe bell of the second pipe, the deformation is offset from the pipe bell of the second pipe.

In any or all of the disclosed embodiments, a crest height of the deformation is from 50% to 300% of the first pipe wall thickness.

In any or all of the disclosed embodiments, the crest height of the deformation is from 80% to 100% of the pipe wall thickness.

In any or all of the disclosed embodiments, the pipe wall thickness is 0.135 inch and the crest height of the deformation is 80% to 90% of the pipe wall thickness, or the pipe wall thickness is 0.25 inch and the crest height of the deformation is 70% to 80% of the pipe wall thickness.

In another representative embodiment, a pipe joint comprises a first pipe comprising an end portion configured as a pipe spigot, and a second pipe comprising an end portion configured as a pipe bell. The pipe spigot is inserted into the pipe bell and welded to the pipe bell to seal the joint between the pipe spigot and the pipe bell, and the first pipe comprises an outwardly-extending, buckle-inducing deformation that is spaced apart from the pipe bell of the second pipe.

The foregoing and other objects, features, and advantages of the disclosed technology will become more apparent from the following detailed description, which proceeds with reference to the accompanying figures.

BRIEF DESCRIPTION OF THE DRAWINGS

FIGS. 24A-24F are perspective views of numerical simulations of the pipes in FIG. 23 subjected to bending.

FIG. 25 is a graph illustrating displacement of a 0.135 inch thickness pipe with a deformation three inches from the exterior weld of a lap joint and a pipe with a deformation six inches from the exterior weld of a lap joint in axial compression and without internal pressure.

FIGS. 26A-26D are perspective views of numerical simulations of the pipes in FIG. 25 subjected to axial compression.

DETAILED DESCRIPTION

Certain embodiments of the disclosure concern pipeline joints and structural features that can be created in the pipes to induce buckling at a selected location spaced away from the joint along the pipe axis. In certain embodiments, a pipe joint can be configured as a welded lap joint between a first pipe comprising a spigot end and a second pipe comprising a bell, hub, or other increased diameter end portion configured to receive the spigot end of the first pipe. The bell/hub and spigot of the respective pipes can be welded together. In other embodiments, the first pipe and the second pipe can be butt-welded together. One or both of the first pipe and/or the second pipe can comprise an annular, buckle-inducing feature, referred to herein as a deformation, formed in the pipe and extending circumferentially around the pipe. The deformation can be spaced apart axially from the pipe joint, and in particular from the welds of the pipe joint. The shape, height, and location of the deformations can be configured to provide strength in axial loading and bending during normal operation, reduce manufacturing complexity, and ensure that the pipe will buckle at the preselected location of the deformation well away from the welds of the pipe joint when subjected to a geohazard event such as an earthquake.

Example 1

Figure 1:
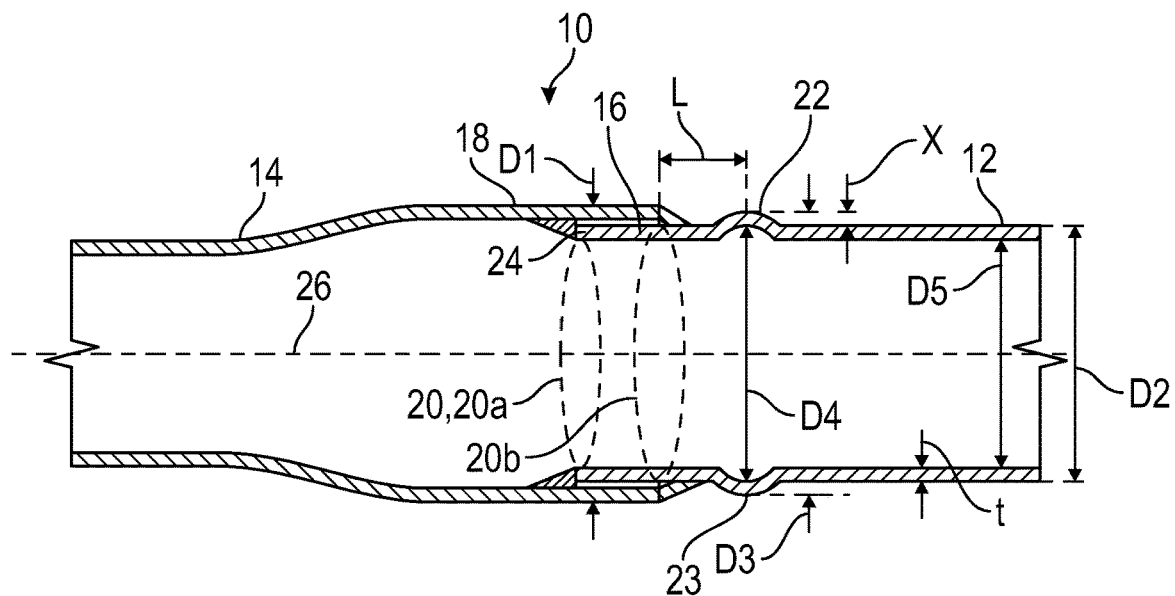
FIG. 1 is a cross-sectional side elevation view of a welded lap joint between two pipes, according to one embodiment.

FIG. 1 illustrates a joint 10 between a first pipe 12 and a second pipe 14 in a pipeline. In the illustrated embodiment, the joint 10 is configured as a welded lap joint in which a first end 16 of the first pipe 12 is received in a first end 18 of the second pipe 14. The first end 16 of the first pipe 12 can be configured as a pipe spigot. The first end 18 of the second pipe 14 can comprise a hub or bell having a diameter $D_1$ greater than the diameter $D_2$ of the main body or main portion of the second pipe 14 (and of the first pipe 12), and can be configured to receive the first end 16 of the first pipe 12. The joint 10 can comprise one or a series of welds indicated at 20 to join the pipes 12 and 14 together and seal the joint. For example, in the illustrated embodiment the joint 10 can comprise an internal fillet weld 20a joining the spigot end of the first pipe 12 to the interior surface of the bell of the second pipe 14, and an external fillet weld 20b joining the bell end of the second pipe 14 to the exterior surface of the first pipe. In other embodiments, the pipe joint can include one of the fillet welds 20a or 20b, or more than two welds, depending upon the particular characteristics desired.

The first pipe 12 can comprise an increased diameter, buckle-inducing feature configured as a rib, bulge, raceway, ring, recess, concavity, or deformation 22 formed in the first pipe and projecting or extending outwardly from the first pipe. The deformation 22 can be spaced apart from the joint 10, spaced apart from the welds 20, and/or spaced apart from the outflow end 24 of the first pipe 12 (e.g., in an upstream direction). In certain embodiments, the deformation 22 can comprise an annular bulge or recess formed such that the outer diameter $D_3$ of the deformation is greater than the outer diameter $D_2$ of the first pipe, and such that the inner diameter $D_4$ of the deformation 22 is greater than the inner diameter $D_5$ of the first pipe. The deformation 22 can comprise a convex surface on the exterior of the pipe 12.

Figure 12A:
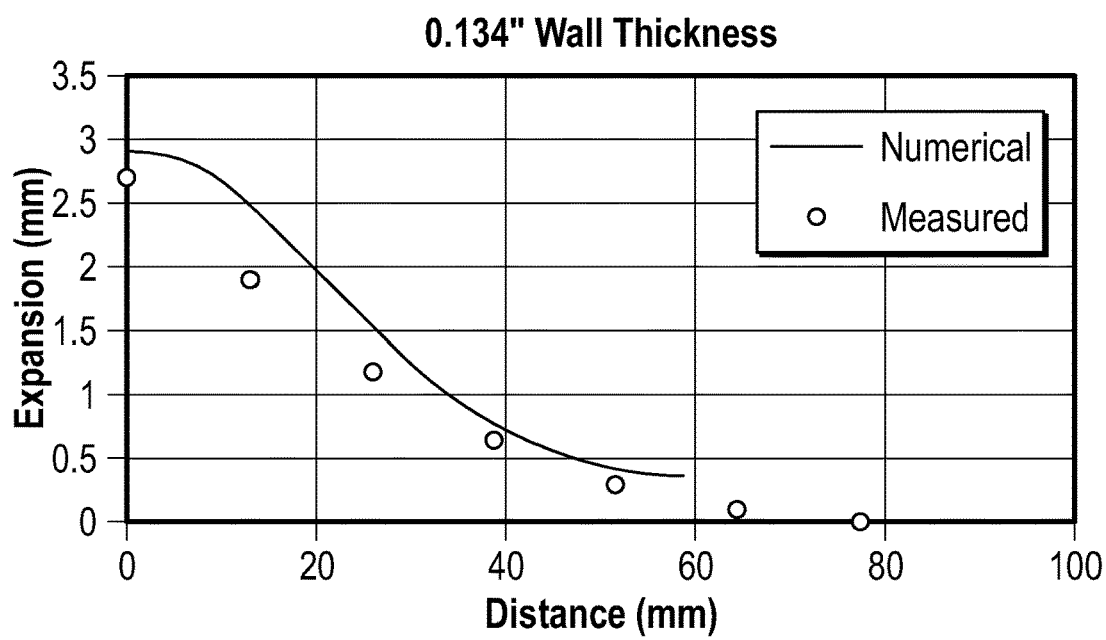
FIG. 12A is a graph illustrating a contour of a portion of a representative embodiment of a buckle-inducing deformation in a pipe according to one embodiment.
Figure 12B:
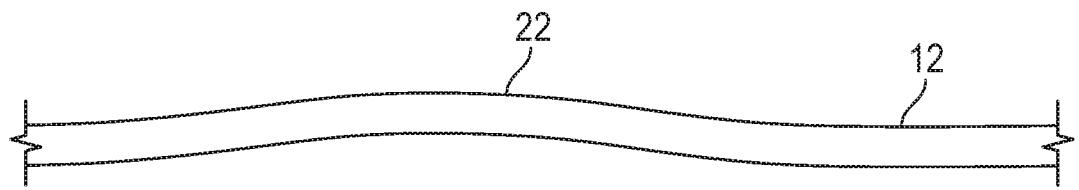
FIG. 12B is a magnified partial cross-sectional view of a pipe including another embodiment of a buckle-inducing deformation.

In certain embodiments, the deformation 22 can be symmetric about the first pipe longitudinal axis 26. For example, in certain embodiments the deformation 22 can be curved, and can have a constant or substantially constant radius (e.g., as measured relative to the longitudinal axis 26. In certain embodiments, the deformation 22 can comprise a wave-shaped cross-section. FIG. 12A illustrates the contour of a representative embodiment of a deformation 22 from the apex or crest 23 of the deformation to the regular exterior surface of the pipe on one side (e.g., upstream of the crest). In FIG. 12A, the deformation 22 can be symmetric about the y-axis, and can have a contour shaped like a sine wave (e.g., on both the interior and exterior surfaces of the pipe). In certain embodiments, the contour of the deformation 22 can be curved or round (e.g., can have a substantially constant radius). FIG. 12B is a magnified partial cross-section showing one edge of a pipe 12 and an exemplary shape of another buckle-inducing deformation 22 formed therein. In other embodiments the radius, crest height, and/or the shape of the deformation can vary around the circumference of the pipe 12. In yet other embodiments, the deformation can extend around only a portion of the circumference of the pipe 12, for example, 25%, 50%, or 75% of the circumference of the pipe. In still other embodiments, the deformation can comprise a compound curve shape, and can include multiple crests or apices of the same or different heights spaced apart by curved portions along the pipe axis.

In particular embodiments, the deformation 22 can be axially spaced from the bell 18, and can be located at any location along the pipe axis between the ends of the pipe. In certain embodiments, the deformation 22 can be located close to the bell or hub of the second pipe, without interfering with the joint or installation of the pipes. For example, in certain embodiments the crest 23 of the deformation can be axially spaced from the bell 18 (e.g., as measured from the edge of the bell portion 18) by a distance L (FIG. 1). The distance L can be, for example, 2 inches (5.08 cm) to 36 inches (91.44 cm) along the first pipe as measured from the edge of the second pipe 14 (or the weld 22b). In particular embodiments, the crest 23 of the deformation 22 can be axially spaced apart from the hub by 2 inches (5.08 cm) to 10 inches (25.4 cm), such as by 3 inches (7.62 cm) to 8 inches (20.32 cm), 3 inches (7.62 cm) to 6 inches (15.24 cm), at least 2 inches (5.08 cm), at least 3 inches (7.62 cm), or at least 4 inches (10.16 cm), depending upon the particular characteristics desired and the equipment used to form the deformation. In certain embodiments, the crest 23 of the deformation 22 can be from 2 inches (5.08 cm) to 36 inches (91.44 cm), 2 inches (5.08 cm) to 10 inches (25.4 cm), 3 inches (7.62 cm) to 8 inches (20.32 cm), at least 2 inches (5.08 cm), at least 3 inches (7.62 cm), or at least 4 inches (10.16 cm) from the outflow end 24 of the first pipe 12.

In particular embodiments, the first and second pipes 12 and 14 each have a respective pipe wall, and the pipe walls of the first and second pipes can have a common thickness t in a direction perpendicular to the longitudinal axes of the first and second pipes, although in other embodiments the walls of the two pipes may have different thicknesses. The deformation 22 can be symmetric about the longitudinal axis of the first pipe, and can extend or project outwardly from an outer surface of the first pipe by a projection distance or crest height x that is from 50% to 1,000% of the thickness of the pipe walls. In certain embodiments, the projection distance x is 50% to 600%, 50% to 500%, 50% to 400%, 50% to 300%, 50% to 200%, 50% to 100%, 60% to 100%, 70% to 100%, 80% to 100%, 70% to 90%, 70% to 80%, 80% to 90%, 500% or less, 400% or less, 300% or less 200% or less, or 100% or less of the thickness of the pipe walls. In particular embodiments, the projection distance x can be 0.5 times to 5.0 times the thickness t of the pipe wall.

In certain embodiments, the crest of the deformation 22 can be disposed or offset radially inwardly from the exterior surface of the second pipe 14 toward the axis 26. In other words, in the illustrated configuration, the deformation 22 does not extend beyond the height of the exterior surface of the second pipe 14, although the deformation may extend beyond the exterior surface of the second pipe in other embodiments.

In a particular embodiment, the thickness t of the pipe walls can be 0.135 inch (3.4 mm) and the projection distance or crest height x can be 80% to 90% of the thickness of the pipe walls, such as 80% to 85%, or 83% of the thickness of the pipe walls (or of the thickness of the first pipe at the location of the deformation). In certain embodiments, this combination of pipe wall thickness and crest height/projection distance can result in the axial strains induced at the spigot of the first pipe due to formation of the deformation being lower than the axial residual strains at the bell of the second pipe.

In another embodiment, the thickness t of the pipe walls can be 0.25 inch (6.35 mm) and the projection distance or crest height x can be 70% to 80% of the thickness of the pipe walls, such as 70% to 75% or 72% of the thickness of the pipe walls (or of the thickness of the first pipe at the location of the deformation). This combination of pipe wall thickness and crest height or projection distance can also result in the axial strains induced at the spigot of the first pipe due to formation of the deformation being lower than the axial residual strains at the bell of the second pipe In certain embodiments, the deformation 22 can be configured as an inwardly extending projection or rib (e.g., such that there is a recess created on the exterior diameter of the pipe). In other embodiments, the pipe can comprise more than one deformation, such as two deformations, three deformations, etc., (see FIG. 8).

In certain embodiments, the deformation 22 can be formed by placing a mandrel or expander apparatus inside the first end portion or spigot of the first pipe 12. The expander can comprise a push ring or other expansion device including an annular ring, rod, wire, cable, etc., disposed around the push ring. The annular ring can be pressed against the inner surface of the first pipe 12 (e.g., by expansion or radially outward movement of the push ring) such that the ring forms an impression or recess in the first pipe to form the deformation.

Figure 2:
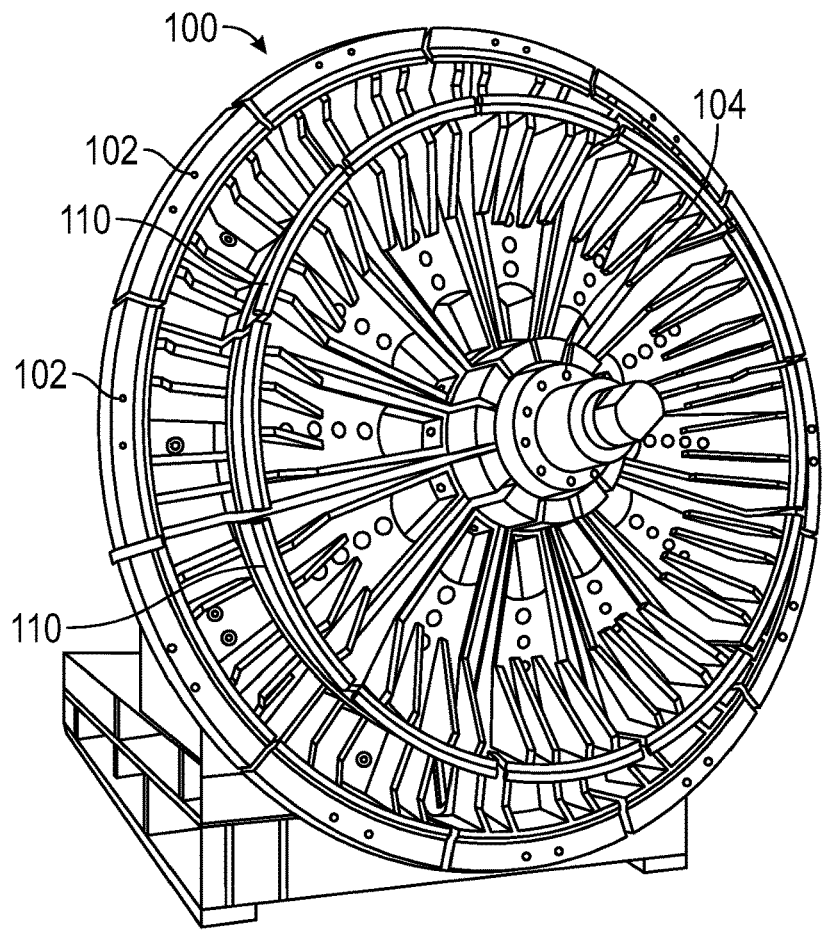
FIG. 2 is a front end perspective view of a pipe expander apparatus including a plurality of dies comprising stamping members, according to one embodiment.
Figure 3:
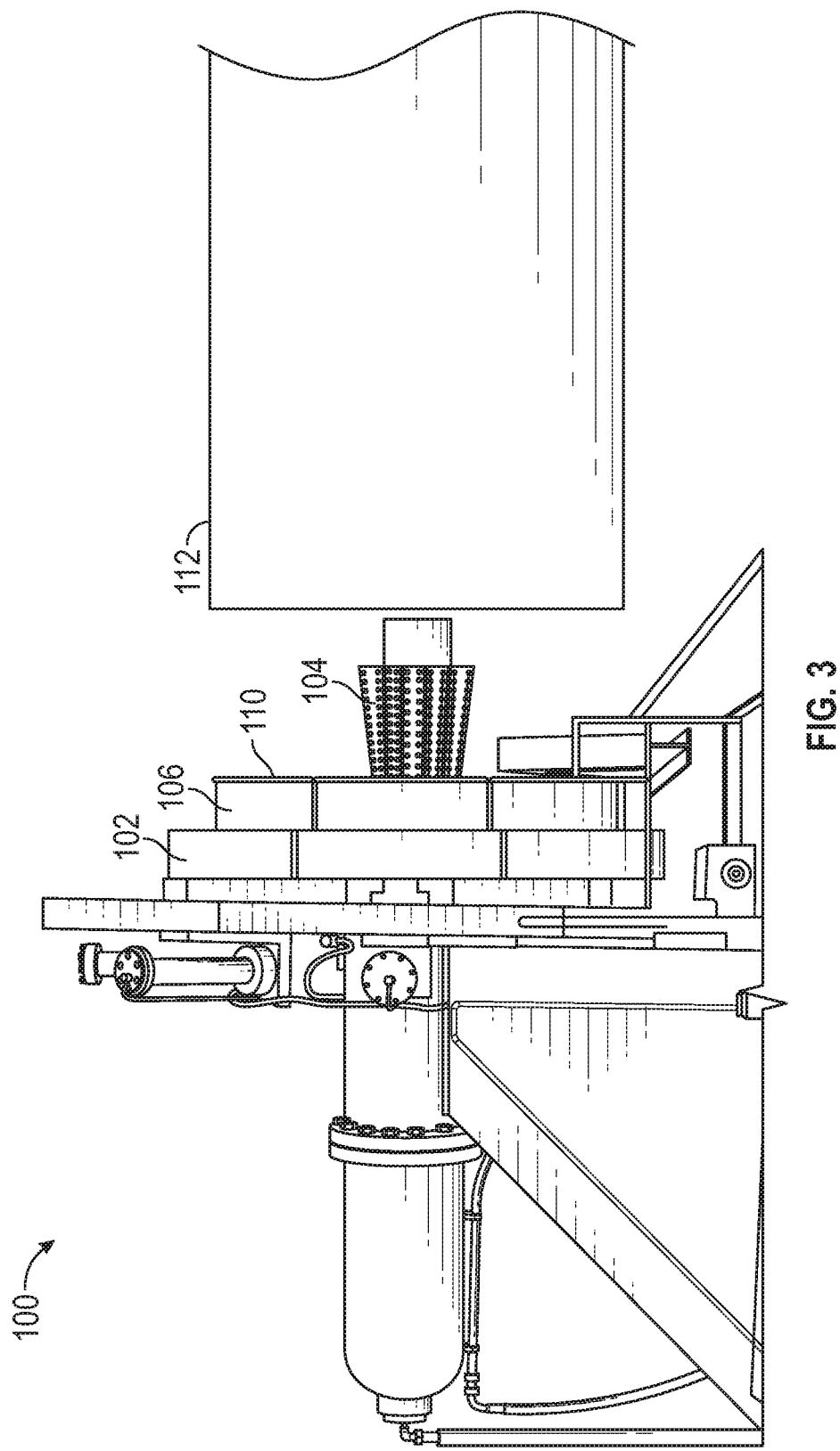
FIG. 3 is a side view of the pipe expander apparatus of FIG. 2.

For example, FIGS. 2 and 3 illustrate a representative embodiment of an expander apparatus 100 comprising a plurality of dies 102 arranged circumferentially around a spreader member or cone 104. As best shown in FIG. 3, the diameter of the cone 104 can increase along its length in a direction away from the dies 102. Accordingly, by moving the dies 102 longitudinally along the cone 104, the increasing diameter of the cone can move or urge the dies radially outwardly from the central axis of the expander.

Figure 4:
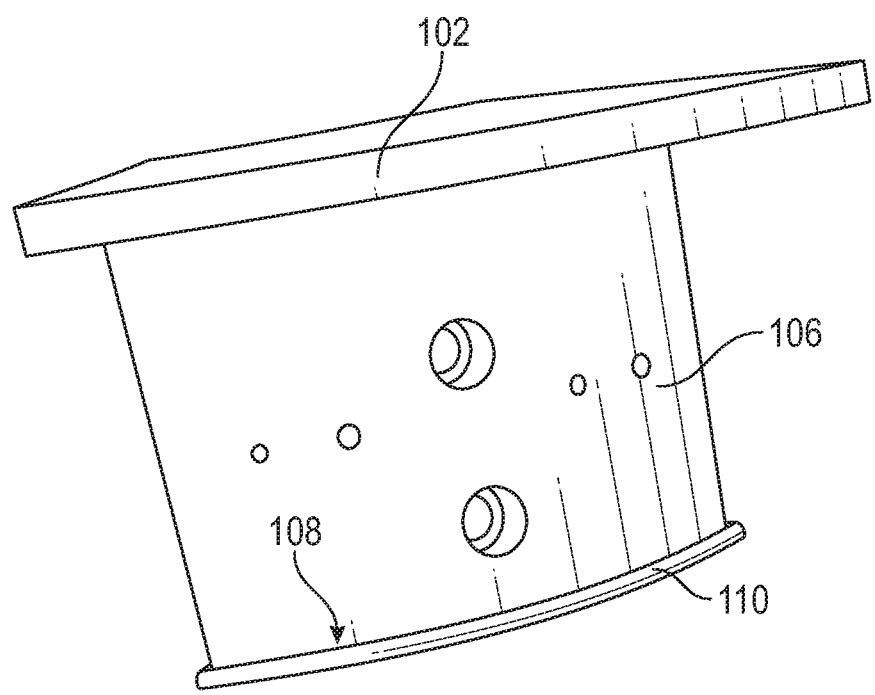
FIG. 4 is a perspective view of a representative embodiment of a pipe expander die, according to one embodiment.

Referring to FIG. 4, the dies 102 can comprise extension portions or flanges 106 configured to contact the interior surface of a pipe disposed over the dies. The flanges 106 can comprise a length L and a free end portion 108. Each die 102 can comprise a forming member or stamping member 110 configured as a curved rod, wire, cable, or other generally cylindrical member coupled (e.g., welded) to the free end portion 108 of the flange 106. When the dies 102 are disposed on the expander, the forming members 110 can be arranged end-to-end in a generally circular shape. The length of the flange 106 and the position of the forming members 110 along the flange can be varied to vary the location of a deformation formed in a pipe.

To form the deformation, a pipe 112 (e.g., corresponding to the pipe 12 of FIG. 1) can be positioned over the flanges 106 of the dies 102. The cone 104 can then be moved for example, to the left in FIG. 3, to advance the dies radially outwardly, thereby bringing the forming members 110 into contact with the inside surface of the pipe to form the deformation. The forming can be performed cold (e.g., at ambient temperature, without heating the steel), or with the pipe at elevated temperature, depending on the particular characteristics desired. The pipe 112 can also be subject to heat treatment following formation of the deformation.

Figure 5:
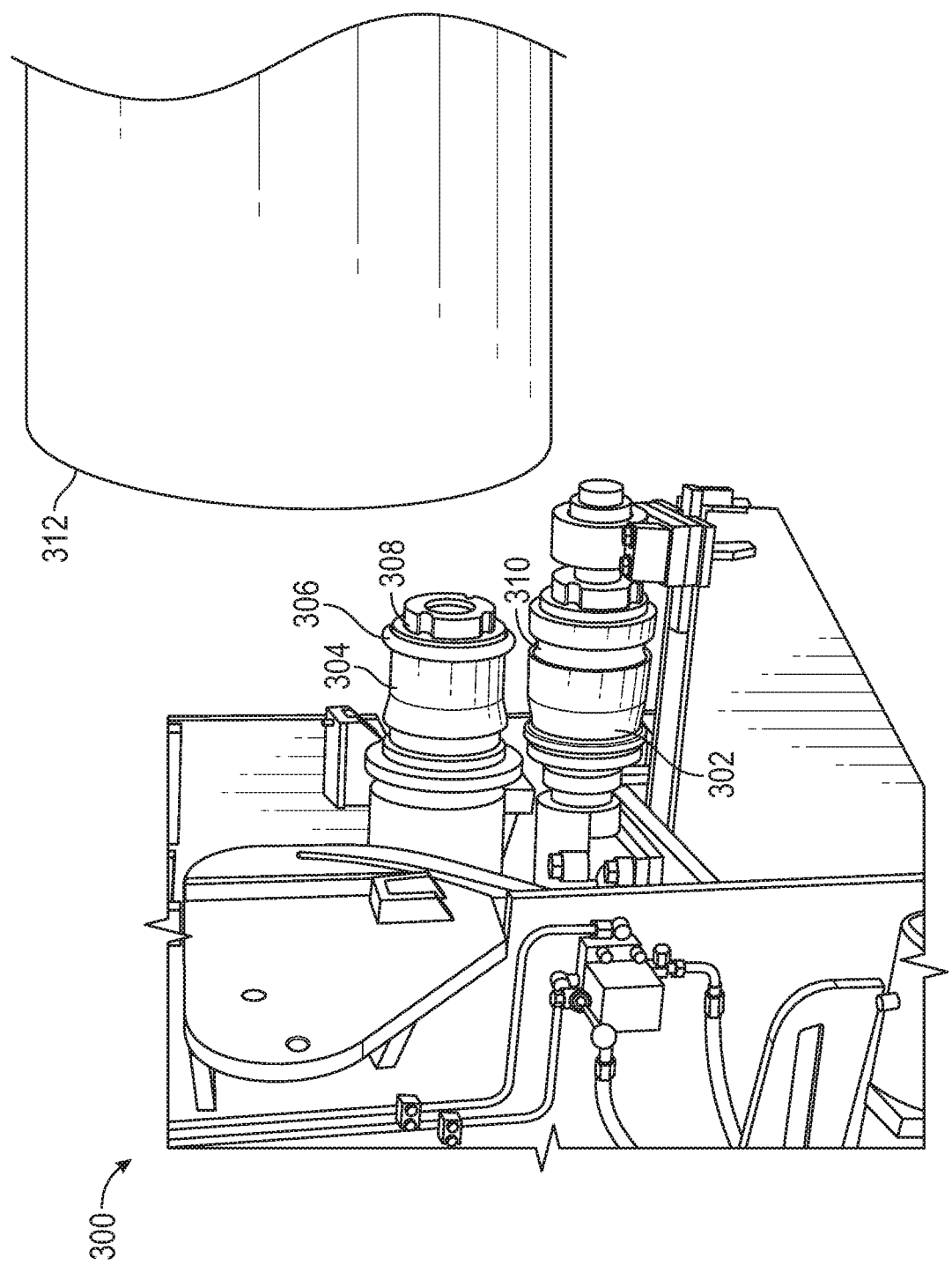
FIG. 5 is a perspective view of a roll grooving machine that can be used to form a deformation in a pipe, according to one embodiment.

FIG. 5 illustrates another embodiment of a system configured as a roll grooving machine 300 that can be used to form the deformation in the pipe. The roll grooving machine 300 can comprise a first rotatable die member 302 and a second rotatable die member 304 generally parallel to and vertically offset from the first die 302. The second die 304 can comprise a rod or forming member 306 disposed circumferentially around a distal end portion 308 of the second die. The first die 302 can comprise a circumferential recess or groove 310 sized and shaped to receive the pipe wall as it is deformed by the forming member 306.

In use, a pipe 312 can be disposed such that the first die 302 is located outside the pipe and the second die 304 is disposed inside the pipe. A hydraulic press of the system 300 can move the second die 304 downwardly such that the wall of the pipe 312 is pressed between the dies 302 and 304, and such that the second die 304 and/or the forming member 306 engage the inside surface of the pipe. The first die 302, which can be driven by a motor, can then be rotated. Rotation of the first die 302 can cause corresponding contra-rotation of the pipe 312 and of the die 304. The forming member 306 can form the deformation by deforming the wall of the pipe 312 into the groove 310 of the first die 302.

Example 2

Figure 6:
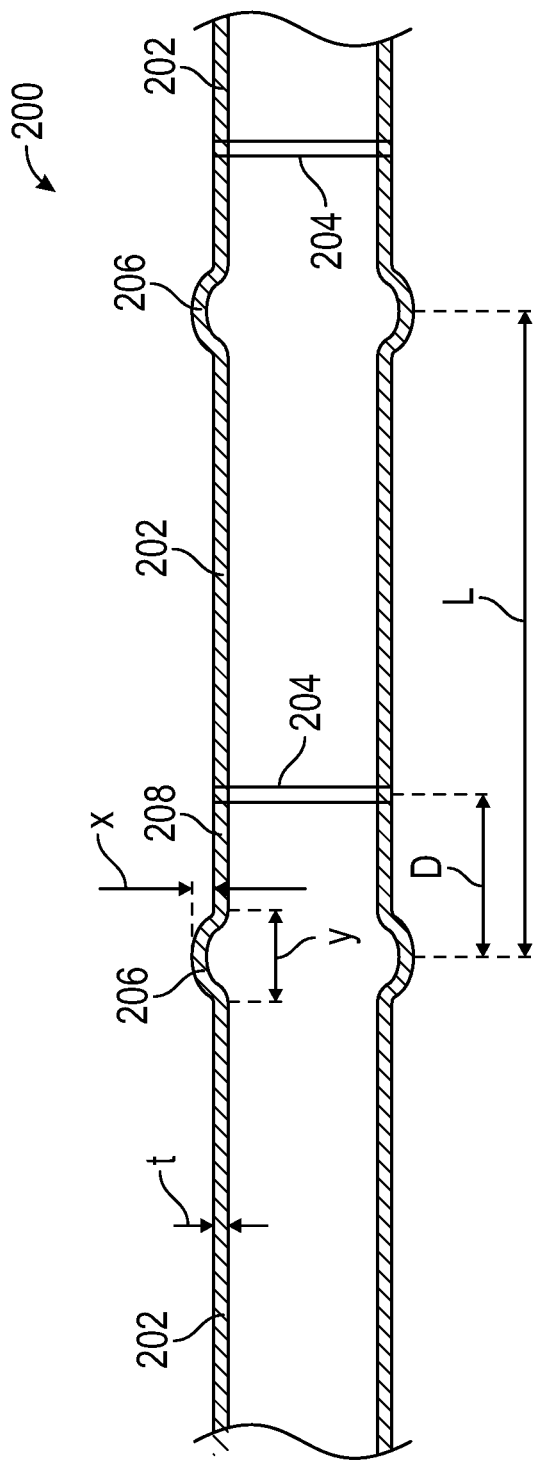
FIG. 6 is a cross-sectional side elevation view of a section of a pipeline including butt-welded pipeline segments having buckle-inducing deformations spaced apart from the butt-welded joints, according to one embodiment.

Although the pipe embodiments described above are particularly with reference to welded lap joints, the pipe and deformation embodiments may also be used in other types of welded pipe joints, such as welded butt joints. FIG. 6 illustrates a representative embodiment of a pipeline 200 including a plurality of pipes or pipe sections 202 joined together at butt joints, such as welded butt joints 204. In certain embodiments, the pipe sections 202 can each comprise an outwardly-extending, buckle-inducing deformation 206 at a location along the length of the pipe section. The deformations 206 can be spaced apart from the welded butt joints 204 at any position along the pipe axis. Thus, the deformations 206 can be configured to induce buckling of the pipeline at location(s) spaced apart from the joints 204, as described above. For example, in certain embodiments the deformations 206 can be spaced apart from the end portions 208 of the pipe sections (and/or from the edges of the joints 204) by a distance D, which can be 1 inch (2.54 cm) to 36 inches (91.44 cm), 2 inches (5.08 cm) to 30 inches (76.2 cm), 4 inches (10.16 cm) to 24 inches (60.96 cm), 4 inches (10.16 cm) to 18 inches (45.72 cm), 2 inches (5.08 cm) to 10 inches (25.4 cm), at least 2 inches (5.08 cm), at least 3 inches (7.62 cm), at least 4 inches (10.16 cm), etc. In certain embodiments, the deformations can have a crest height x that is 50% to 1,000% of the wall thickness t of the pipe sections 202, such as 50% to 600%, 50% to 400%, 50% to 300%, 50% to 200%, or 50% to 100% of the wall thickness t of the pipe sections 202, or any of the other crest height ranges described herein.

In the illustrated embodiment, the deformations 206 can be located near the ends of the pipe sections, but may be located anywhere along the length of the pipe sections. For example, in the illustrated embodiment the deformations 206 are proximate one end of the pipe sections 202 such that the deformations are closer to the weld at that end of the pipe section than the weld at the opposite end of the pipe section.

In certain embodiments, the deformations 206 can have a length dimension y measured along the axis of the pipeline 200. The length dimension y can be from 1 inch (2.54 cm) to 36 inches (91.44 cm), such as 2 inches (5.08 cm) to 30 inches (76.2 cm), 3 inches (7.62 cm) to 24 inches (60.96 cm), 4 inches (10.16 cm) to 18 inches (45.72 cm), etc. In particular embodiments, the length y can be 4.7 inches (120 mm).

In the illustrated embodiment, the deformations 206 are spaced apart by a distance L. In certain embodiments, the distance L can correspond to the length of the pipe sections 202, such as 80 ft (24.38 m), 60 ft (18.28 m), 40 ft (12.19 m), 30 ft (9.14 m), 20 ft (6.09 m), 10 ft (3.04 m), etc. In certain embodiments, the deformations 206 can be spaced apart from each other at regular intervals, and/or at varying distances along the length of the pipeline depending upon the particular conditions and characteristics sought. In certain embodiments, the pipe sections can comprise more than one deformation 206, such as two, three, or more deformations, which can be evenly spaced from each other or at any interval. In other embodiments, not every pipe section 202 need comprise a deformation 206. For example, in certain embodiments every other or every second pipe section 202 can comprise a deformation.

Example 3

Figure 7:
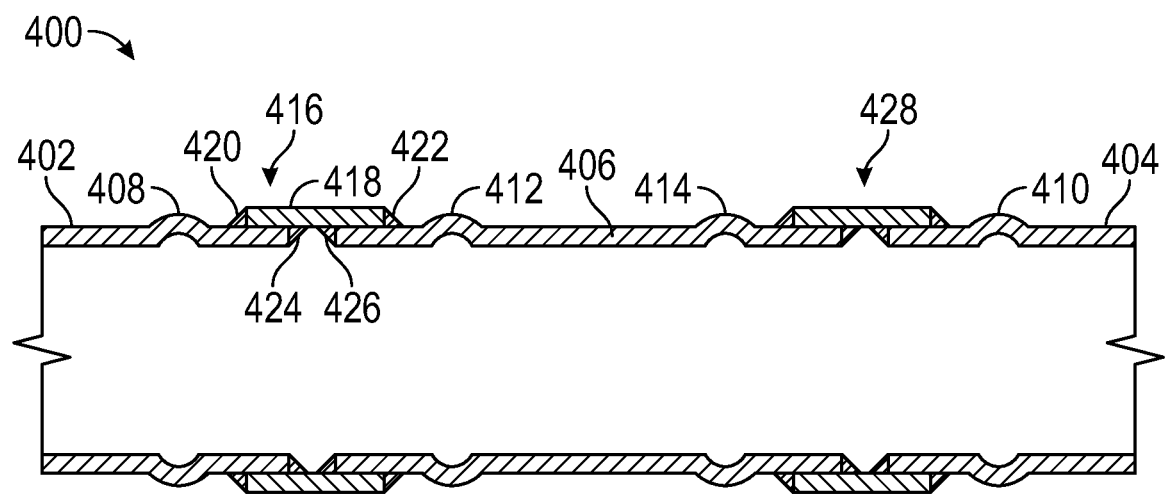
FIG. 7 is a cross-sectional side elevation view of a section of a pipeline including a butt-welded pipeline segment having multiple buckle-inducing deformations.

In certain embodiments, a pipeline can comprise one or more relatively short pipe sections disposed between longer pipe sections. In such embodiments, the short pipe section can comprise one or multiple buckle-inducing deformations, which can be in relatively close proximity to the deformations at the end portions of the longer pipe sections. The overall effect can be to provide a plurality of buckle-inducing deformations in a relatively short distance. For example, FIG. 7 illustrates a pipe joint 400 including a first pipe 402, a second pipe 404, and a third pipe 406 disposed between the first and second pipes, and which is shorter than the first pipe and the second pipe (e.g., 10%, 20%, 30%, etc., of the length of the first pipe and/or the second pipe).

The first pipe 402 can comprise a buckle-inducing deformation 408 at the end portion adjacent the third pipe 406, and the second pipe 404 can comprise a buckle-inducing deformation 410 at the end portion that is adjacent the third pipe 406. The third pipe 406 can also comprise one or a plurality of deformations. For example, in the illustrated embodiment the third pipe 406 comprises a deformation 412 and a deformation 414, although in other embodiments the third pipe can include more deformations (e.g., three or more deformations) or fewer deformations (e.g., one deformation or no deformations) depending upon the particular application.

The first pipe 402 and the third pipe 406 can be welded together at a first joint 416 configured as a butt joint. More particularly, the ends of the first pipe 402 and the third pipe 406 can be welded (e.g., fillet welded) to a reinforcing member 418 configured as a butt strap extending between the first pipe and the third pipe, and encircling or enclosing the interface between the first pipe and the third pipe. One circumferential edge of the reinforcing member 418 can be welded to the exterior surface of the first pipe 402 at a fillet weld 420, and the other circumferential edge of the reinforcing member can be welded to the exterior surface of the third pipe 406 at a fillet weld 422. Fillet welds 424 and 426 can join the ends of the first pipe 402 and the third pipe 406, respectively, to the interior surface of the reinforcing member 418. In the illustrated embodiment the ends of the first pipe and the third pipe are spaced apart within the reinforcing member, although in other embodiments the ends of the pipes may contact each other. The opposite end of the third pipe 406 can be coupled to the second pipe 404 at a second joint 428, which can be configured similarly to the first joint 416.

As noted above, the overall effect of the pipe joint 400 can be to locate a plurality of buckle-inducing deformations within a short distance of each other along the pipe axis. This can allow the pipe joint 400 to bend or flex about one or more of the deformations in the same direction, or in different directions. Such a joint can be particularly advantageous, for example, in applications where significant displacement of portions of a pipeline may occur, such as at the location where a pipe exits a building (due to settling), or areas prone to significant seismic activity or soil subsidence. The deformations of the first pipe, the second pipe, and the third pipe can be configured according to any of the deformation embodiments described herein. Any of the deformations can be configured similarly or differently from each other, depending upon the particular characteristics desired. For example, in certain embodiments one or more of the deformations can have different heights, lengths, curvatures, etc. In other embodiments, butt-welded joints such as illustrated in FIG. 7 need not include reinforcing members, depending upon the particular requirements of the system.

Example 4

Figure 8:
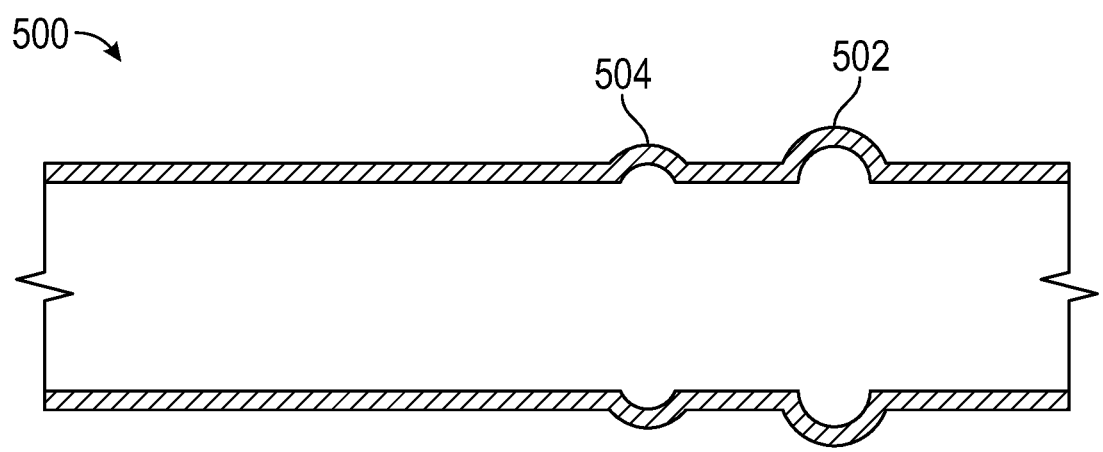
FIG. 8 is a cross-sectional side elevation view of a pipe including a plurality of buckle-inducing deformations of different sizes, according to one embodiment.

Any of the pipe embodiments described herein can also comprise multiple buckle-inducing deformations in relatively close proximity to each other, not all of which need be configured the same. For example, FIG. 8 illustrates a representative example of a pipe 500 comprising two deformations 502 and 504 formed in one end portion. In the illustrated embodiment, the height of the deformation 502 is greater than the height of the deformation 504, although in other embodiments the opposite may be true. The deformations 502 and 504 can also have the same height. The number of deformations is not limited to two, and the pipes described herein may include three, four, five, or more deformations, and the deformations can be of any size and can have any spacing.

Example 5

One or more of the pipe, joint, and/or deformation embodiments described herein can provide significant advantages over known pipes and joints. As described in detail in the examples below, the deformations can be configured to initiate buckling of the pipe at a selected location spaced apart from the joint and/or from the bell or hub of the pipe (in the case of bell and spigot joints) along the longitudinal axis of the pipe. At the same time, pipe joints configured as described herein can withstand nearly the same bending, compressive, and/or tensile loading conditions as comparable joints between plain pipe without deformations.

More particularly, buckle-inducing deformations having dimensions within the ranges given herein can provide strength advantages and manufacturing advantages over existing systems, such as those designed around buckling wavelength(s) of the pipe. For example, recesses formed in pipelines in certain existing systems are sized according to buckling wavelengths or half wavelengths of the pipe. The height of these features tend to be many multiples of the pipe wall thickness (e.g., eight times the wall thickness to as much as 15 times the wall thickness). This means that the recesses must be formed in the pipe at high temperature, which is laborious and requires specialized equipment. In contrast, buckle-inducing deformations configured as described herein can be integrally formed in the pipe sections of a pipeline at ambient temperature, significantly reducing cost and complexity.

Regarding performance, pipe joints including buckle-inducing deformations as described herein can balance the ability to control the location at which the pipe buckles (e.g., during a seismic event) with the need to provide axial and bending strength. For example, embodiments of welded lap joints and butt joints where the pipes include deformations as described herein can withstand bending or buckling of more than 40° away from the pipe axis without loss of pressure containment. Additionally, in certain embodiments, the joints can exhibit ultimate bending strength and ultimate axial strength of more than 80% of the strength of comparable joints between plain pipe without a buckle-inducing feature.

Figure 9:
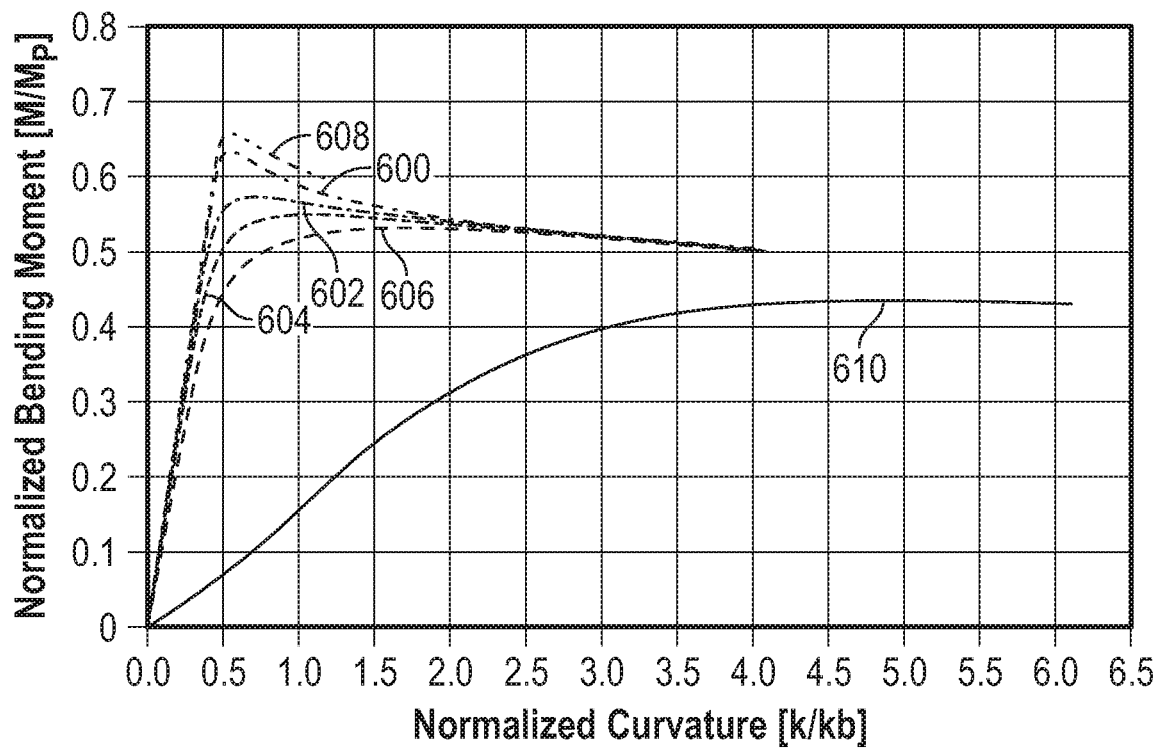
FIG. 9 is a graph illustrating normalized bending curvature as a function of normalized bending moment for a plurality of pipe joints.
Figure 10:
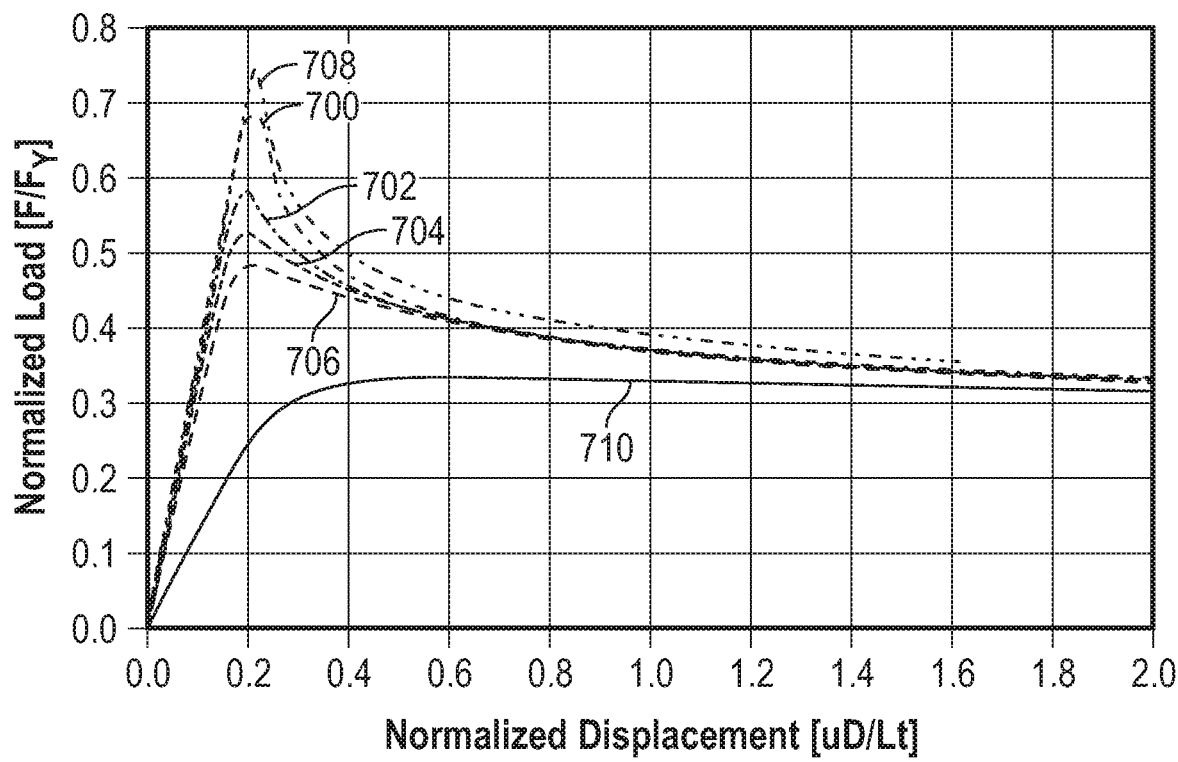
FIG. 10 is a graph illustrating normalized displacement for a plurality of pipe joints as a function of normalized axial load.

For example, FIGS. 9 and 10 illustrate the simulated performance of a series of exemplary welded lap pipe joints configured according to the embodiment of FIG. 1. Each of the simulated pipes had a diameter of 25.75 inches (65.4 cm), a pipe wall thickness of 0.135 inch (3.4 mm), and was pressurized to 40% of the yield pressure $P_y$. The simulated pipe joints had buckle-inducing deformations of varying height. For example, the pipe joint represented by curve 600 in FIG. 9 had a deformation height of 0.83 times the pipe wall thickness t (0.112 in) (2.8 mm). The pipe joint represented by the curve 602 had a deformation height of two times the pipe wall thickness, the pipe joint represented by the curve 604 had a deformation height of three times the pipe wall thickness, and the pipe joint represented by the curve 606 had a deformation height of four times the pipe wall thickness. The curve 608 is representative of a welded lap joint with no deformation. The curve 610 is configured according to an existing system with a deformation height of 2.19 inches (approximately 16 times the wall thickness t) based on a buckling wavelength of 4.52 inches, which is significantly larger than the deformations of the present disclosure.

FIG. 9 illustrates the normalized bending moment of the pipe joints versus the normalized curvature of the pipe joints. As shown in FIG. 9, the pipe joint with a buckle-inducing deformation of 0.83t represented by curve 600 withstood nearly the same maximum bending moment as the pipe joint without a deformation represented by curve 608, reaching a peak of approximately 0.63 M/Mp at a curvature of 0.5 k/kb before buckling (e.g., at the buckle-inducing deformation). The pipe joint with a deformation height of 0.83t displayed only limited curvature up to a bending moment significantly above 0.6 M/Mp, while the existing pipe joint represented by curve 610 reached the same curvature of 0.5 k/kb at a bending moment below 0.1 M/Mp. Thus, the pipe joint of curve 600 withstood more than six times the bending moment of the pipe joint of curve 610 for an equivalent amount of curvature. Each of the pipe joints represented by curves 602-606 with deformation heights configured according to the embodiments described herein also withstood significantly greater bending than the pipe joint of curve 610 before buckling. This means that the pipe joints as described herein will continue to provide full or nearly full volume flow capacity at relatively high loads before buckling.

FIG. 10 illustrates simulations of the same pipe joints as FIG. 9 in compression loading. In FIG. 10, the curve 700 represents the pipe joint with a deformation height of 0.83t, the curve 702 represents the pipe joint with a deformation height of 2t, the curve 704 represents the pipe joint with a deformation height of 3t, the curve 706 represents the pipe joint with a deformation height of 4t, the curve 708 represents the welded lap joint without a deformation, and the curve 710 represents the pipe joint configured according to the existing buckling wavelength system with the deformation height of 2.19 inches and the buckling wavelength of 4.52 inches. As shown in FIG. 10, the pipe joint represented by the curve 700 withstood nearly 70% of the yield force $F_y$ before buckling, only slightly below the pipe joint 708 without a deformation. The existing pipe joint represented by the curve 710, being configured to buckle when subjected to loading corresponding to ground waves of a specified wavelength, buckles at a substantially lower axial force of only approximately 33% of the yield force $F_y$. In other words, the pipe joint configured according to the embodiments described herein with a buckle-inducing deformation with a height of 0.83t withstood more than two times the axial compressive load of the pipe joint represented by curve 710, and induced buckling at the predetermined location of the deformation. Pipes having a deformation with a crest height of five times (500%) of the pipe wall thickness would be expected to perform similarly to the pipe of curves 606 and 706 with a deformation height of 4t.

Thus, the pipe joint configurations described herein can provide surprisingly superior bending and axial strength advantages over known systems, while allowing the location of a buckle in the pipe to be preselected in the event of a geohazard incident. Accordingly, the pipe joint embodiments described herein can withstand significant deformation or buckling at the deformation feature without rupture, and without compromising the welds at the joint or the seal between the pipes, allowing pipes such as municipal water pipes to continue to deliver water without loss of pressure containment.

In certain embodiments, the height of the crest of the deformation can also be configured to provide for a selected amount of lengthening of the pipe if the pipe is placed in tension (e.g., due to ground shifting).

The pipe embodiments described herein can be constructed from any of a variety of metallic materials, such as various steel alloys including, without limitation, ASTM A1011 SS GR36, ASTM A1018 SS GR40, ASTM A516, ASTM A572, ASTM A36, ASTM A283, and/or others listed in the American Water Works Association (AWWA) C200 Steel Water Pipe standard. Steel pipes having the diameter and thickness ranges described herein can advantageously be cold worked at ambient temperature to form buckle-inducing deformations having the dimensions and properties described herein, as well as bell end portions in the case of bell-and-spigot joints. Such forming processes can be carried out as described above at existing pipe mills, without the need for heating large sections of pipe. This can also provide improved strength because strength properties imparted to the steel pipes during rolling at the mill will be retained when the buckle-inducing deformation is formed at ambient temperature, and not lost during heating or annealing.

The pipes, pipe joints, and deformation embodiments described herein can be used for piping water, oil or gas, or other pressurized liquids or fluids. Such pipes can also be used for non-pressurized applications, such as conduits for carrying electrical conductors, fiber optic cables, etc.

Example 6

Large-diameter continuous steel water pipelines with lap-welded joints are often constructed in geohazard areas, where the pipeline may be subjected to severe transient (shaking) and permanent ground-induced actions. The experimental and numerical results presented herein concern 24-inch-diameter pipes, with thickness equal to 0.135 in and 0.25 in, indicated an excellent structural performance of the welded lap joints: under compressive action, the ultimate strength (bending or axial) of the joints has been found to be more than 80% of the corresponding strength of the plain pipe, and—most importantly—the deformation capacity of the joint has been remarkable: the joint specimens have been bent to an angle that exceeded 40 degrees, without loss of pressure containment.

Nevertheless, there exists still some concerns among engineers and owners on the efficiency of lap welded joints in seismic and other geohazard areas, mainly because of the presence of the "bell" and the fact that—in most of the cases—buckling of the joint occurs at the bell, an area that has already been work-hardened and might be prone to fracture. The weld(s) at the bell may also be prone to fracture. The "seismic lap welded joint" embodiments disclosed herein are aimed at improving the mechanical response of welded lap joints, introducing a small initial imperfection/deformation at the spigot side of the weld, referred to as, for example, a "spigot imperfection," "seismic imperfection," or buckle-inducing deformation, in order to cause the buckle to occur at the spigot and prevent the formation of the buckle at the bell.

Numerical results on the structural performance of internally pressurized welded lap joints, subjected to bending and axial compression on 24-inch-diameter pipes (60.96 cm), with two wall thickness; 0.135 inch (3.429 mm) and 0.250 inch (6.35 mm), are presented herein. In some embodiments an imperfection/deformation location, shape, and size at the "spigot" side of a lap joint are proposed, to trigger buckling at the spigot rather than the bell. In certain embodiments, this "seismic imperfection" or deformation can be: (a) large enough to ensure that buckling will occur at the "spigot" pipe, while (b) small enough so that the structural strength of the joint is not significantly reduced, compared to a lap joint without an imperfection/deformation.

The present numerical results show that there can be an optimum size of this imperfection/deformation which can help to ensure that buckling occurs at the spigot and the structural performance of the lap-joint is not affected. Based on the present analysis, in certain embodiments, the optimum size of this imperfection/deformation can range between 70-100% of the pipe wall thickness, such as 80-100%. In practice, this imperfection/deformation can be imposed through a special wire around the expansion mandrel, and its size (amplitude or crest height) can be approximately equal to the pipe wall thickness.

1 INTRODUCTION

Figure 11A:
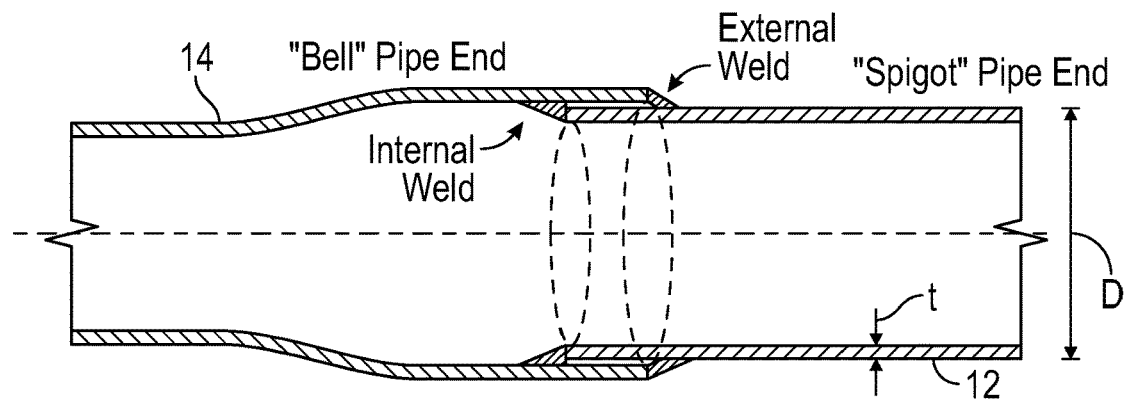
FIGS. 11A and 11B are schematic illustrations of welded lap joints in a pipeline.

Large-diameter continuous-welded steel water pipelines are usually constructed with lap joints instead of butt-welded joints, due to their lower construction cost. A welded lap joint can comprise a "bell" cold-formed at the end of each pipe segment, using an expanded mandrel so that the end of the adjacent pipe segment, often referred to as "spigot", can be inserted and welded to the bell through a single or double full-circumferential fillet weld, as shown in FIG. 11A.

There exists a need for safeguarding the structural integrity of welded steel pipelines for water transmission, constructed in geohazard (seismic) areas. In those seismic areas, the pipeline may be subjected to severe transient (shaking) and permanent ground-induced actions from fault rupture, liquefaction-induced lateral spreading, soil subsidence, or slope instability. Any of these actions may deform the pipe well beyond the stress limits associated with normal operating conditions, possibly well into the inelastic range of the steel material.

2 THE SEISMIC LAP WELDED PIPELINE JOINT CONCEPT

The aforementioned experimental works, and the relevant numerical calculations, indicated an excellent structural performance of the welded lap joints. More specifically, under compressive action, the ultimate bending strength of the joints has been found to be more than 80% of the corresponding strength of the plain pipe, and the deformation capacity of the joint has been remarkable: the joint specimens have been bent to an angle that exceeded 40 degrees, without loss of any pressure containment.

Nevertheless, despite the above excellent results, there exists still some concerns on the efficiency of lap welded joints in seismic and other geohazard areas. The main concern refers to the joint geometry, and the presence of the "bell". The bell is made by cold expansion that introduces significant work-hardening and residual stresses, and—because of its geometry—it imposes a "geometric imperfection" on the pipe, resulting in the formation of a local buckle at that location, associated with the development of high local strains that may lead to pipe wall rupture. Weld failure may also be a concern in certain situations.

It is possible to impose a small initial imperfection/deformation at the spigot side of the weld, in order to enforce the buckle to occur at the spigot, and prevent the formation of the buckle at the bell.

On the other hand, the above "initial imperfection" or "seismic" imperfection/deformation, desirably:

(a) It should be large enough to ensure that buckling would occur at the "spigot" location.

(b) It should be small enough, so that the structural strength of the joint is not significantly reduced.

To satisfy both requirements, a desirable or optimum configuration of the seismic joint can be defined.

Figure 11B:
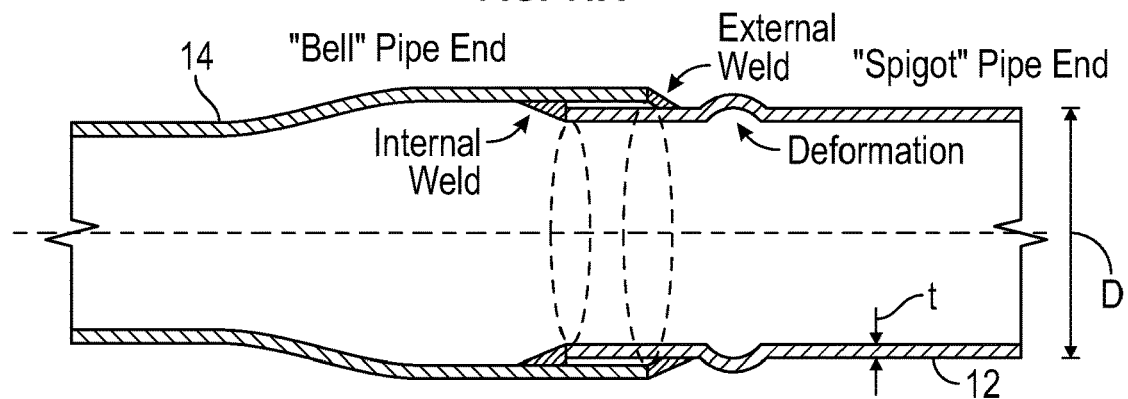

A large number of numerical simulations have been performed, which are summarized herein. In particular embodiments, an initial imperfection/deformation at the spigot is imposed as shown in FIG. 11B, which is similar to the deformation illustrated in FIG. 1. One purpose of this analysis was to examine if the existence of the imperfection/deformation is capable of enforcing a buckling pattern with a local buckle at the spigot (preventing any buckle at the bell), while not affecting the structural strength of the welded lap joint.

3 SCOPE OF WORK

The present study evaluates the effect of the imposed "imperfection" or deformation at spigot side, in the structural performance of welded lap joints both in bending and axial loading, for two levels of internal pressure (zero pressure and 40% of yield pressure $p_y$). Two different pipes are analyzed, the first pipe has 25.75 inch diameter, and a thickness equal to 0.135 in. The second pipe has the same diameter but with thickness equal to 0.25 in. The steel grade of the pipes is ASTM A1011 SS GR36 and ASTM A1018 SS GR40, respectively.

The main target of the present analysis is the definition and evaluation of imperfection/deformation location, size, etc., as described in section 2 above. Towards this purpose, the following issues were evaluated: the location of the imperfection/deformation, the shape of the imperfection/deformation, and the size (height) of the imperfection/deformation.

In certain embodiments, the location of the imperfection/deformation can be at the spigot, and its position can be chosen close to the joint, according to the capabilities of the plant equipment. In certain expanders the pipe can be inserted 8 inches, which is 6 inches from the outside weld. For the sake of completeness, one more case has also been considered for the position of the imperfection/deformation, namely 5 inches from the outer cross section of the spigot pipe (3 inches from the outside weld).

The shape of the imperfection/deformation can be chosen according to the shape of buckling developed when a pipe is subjected to bending with presence of internal pressure. In certain embodiments, this can mean a "bulging" shape.

The size of the imperfection/deformation can be a challenging consideration. To satisfy both conditions above, an in-depth investigation is required. To quantify this analysis, the following criterion was adopted: "the axial strains induced at the spigot pipe due to the imperfection/deformation forming should be lower than the axial residual strains at the bell due to the bell formation". This has been the main feature of the analysis described in the next sections. FIG. 12A depicts the symmetric part of the shape of imperfection/deformation (for the thin pipe with 0.135 in thickness) with respect to the distance from the imperfection "crown". FIG. 12A illustrates a comparison of the shape obtained with the numerical simulation with the shape measured in the plant.

4 DESCRIPTION OF THE NUMERICAL MODEL

Figure 13A:
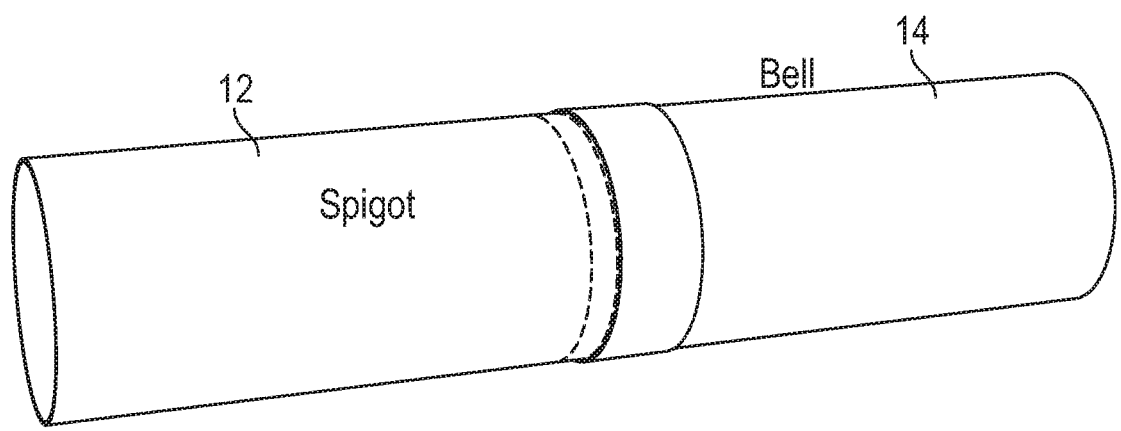
FIGS. 13A and 13B are perspective views illustrating a finite element model of a welded lap joint between two pipes.
Figure 13B:
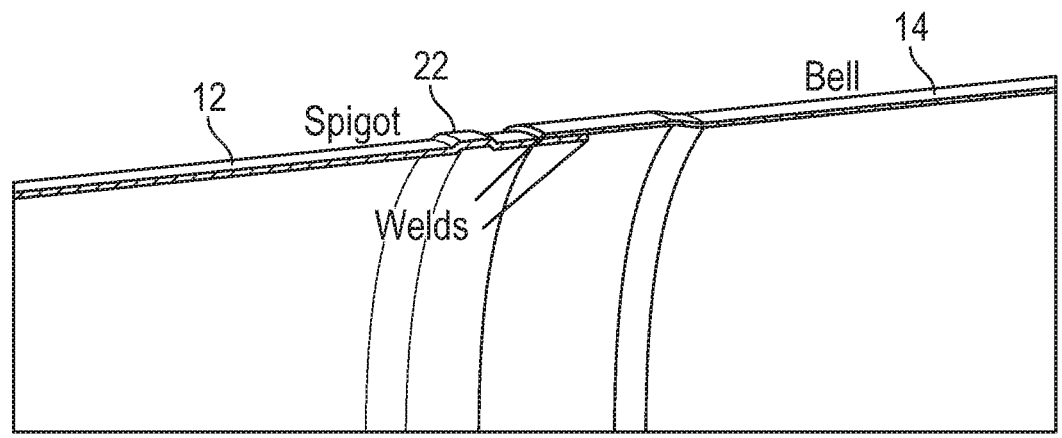
Figure 14A:
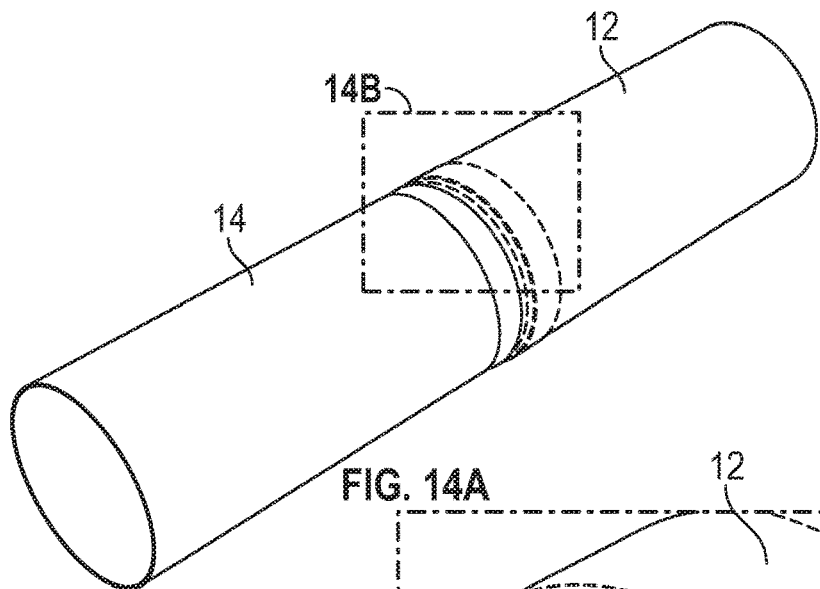
FIGS. 14A and 14B are perspective views illustrating the finite element mesh of the model in FIGS. 13A and 13B.
Figure 14B:
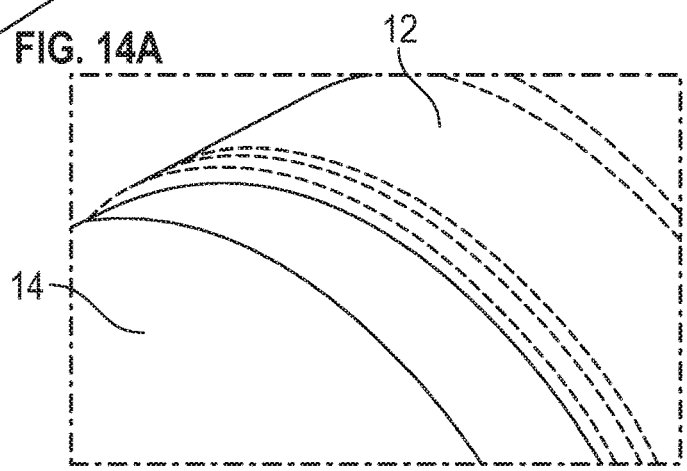

A numerical (finite element) model has been developed in ABAQUS®/standard to simulate the joint behaviour, including this "seismic" imperfection/deformation. The model comprises four (4) main parts, a pipe with a bell configuration, a pipe with an imperfection/deformation at a specific distance from the end cross section (spigot), the outside weld and the inside weld, as shown in FIGS. 13A and 13B. The model employs four-node, reduced-integration shell finite elements, referred to as S4R, for the pipes and 8-node solid "brick" elements for the fillet welds. The mesh is shown in FIGS. 14A and 14B. The total length of the model is 120 inches. The gap size between the bell and the spigot is constant around the pipe and is equal to 0.05 inch, which is within the AWWA C200 requirements.

Figure 15A:
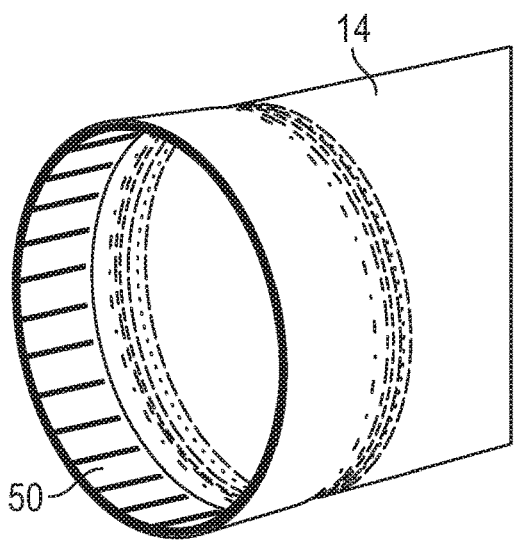
FIGS. 15A and 15B are perspective views illustrating a mandrel located in a pipe, and used for expanding the pipe end to form a bell, according to one embodiment.
Figure 15B:
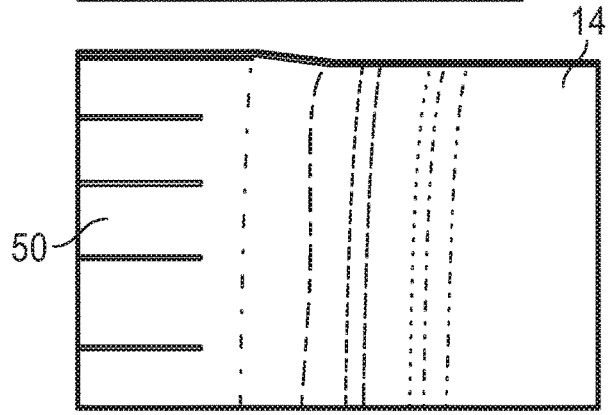
Figure 16:
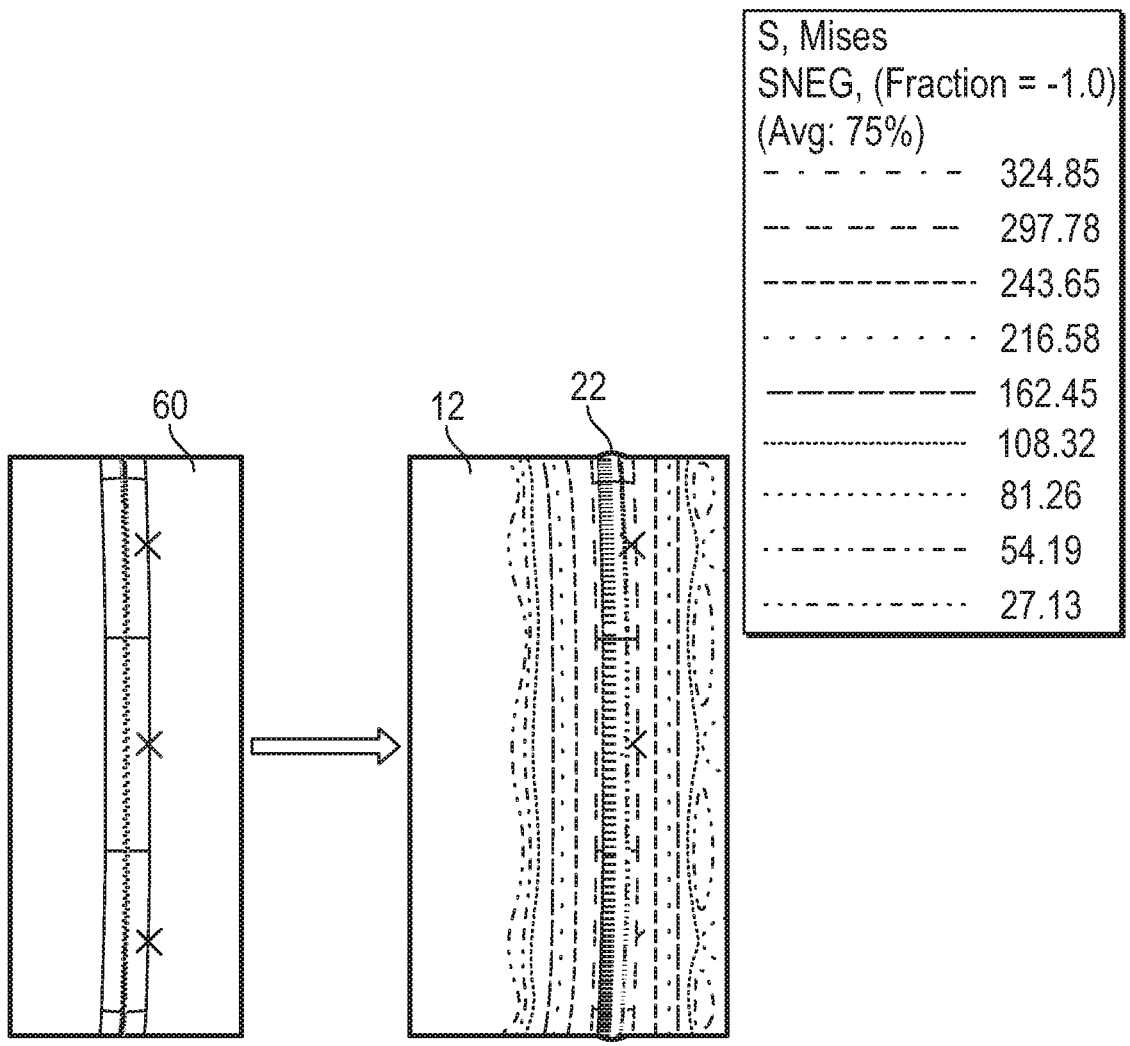
FIG. 16 is a side elevation view illustrating a mandrel and formation of a deformation in a pipe, according to one embodiment.
Figure 17:
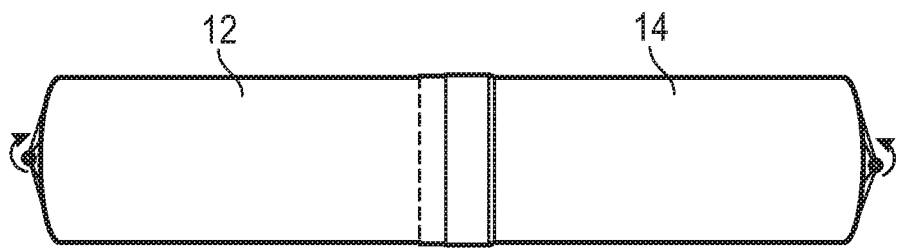
FIG. 17 is a side elevation view of the model of FIGS. 13A and 13B in bending.

Initially bell expansion was simulated. The bell configuration was achieved by expanding the pipe end, using an appropriate mandrel (rigid body) 50 that moves outwards at the radial direction, as shown in FIGS. 15A and 15B. Subsequently, the imperfection/deformation of deformation at the spigot side was imposed. The imperfection/deformation at spigot was achieved by expanding the pipe at a specified location using an appropriate mandrel (rigid body) 60 that moved outwards in the radial direction as shown in FIG. 16, as performed in the plant.

Following the bell formation, the imperfection/deformation of the spigot was simulated. For the pipe with 25.75-inch-diameter and a thickness equal to 0.135 in, two cases were under consideration for the position of the deformation at spigot side. In the first case, deformation was imposed at 5 inches from the end cross section (3 inches from the outside weld), and in second case the deformation was at 8 inch from the end cross section (6 inches from the outside weld). For the 0.25 in thickness pipe, deformation was created at 5 inches from the end cross section (3 inches from the outside weld).

After spigot formation, the spigot and the bell were connected with the weld parts using appropriate kinematic constraints, which ensured the continuity of the geometry. Kinematic constraints were employed as follows; a "tie" was used to connect the spigot and the welds, and a "rough contact" with "no separation" was employed to connect the bell with the welds.

Figure 18:
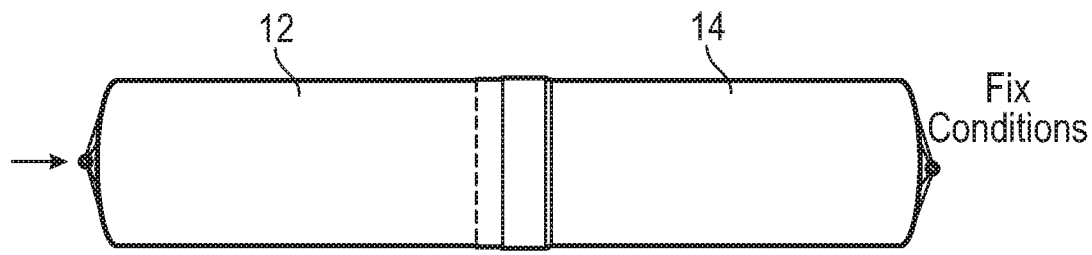
FIG. 18 is a side elevation view of the model of FIGS. 13A and 13B in axial compression.
Figure 19:
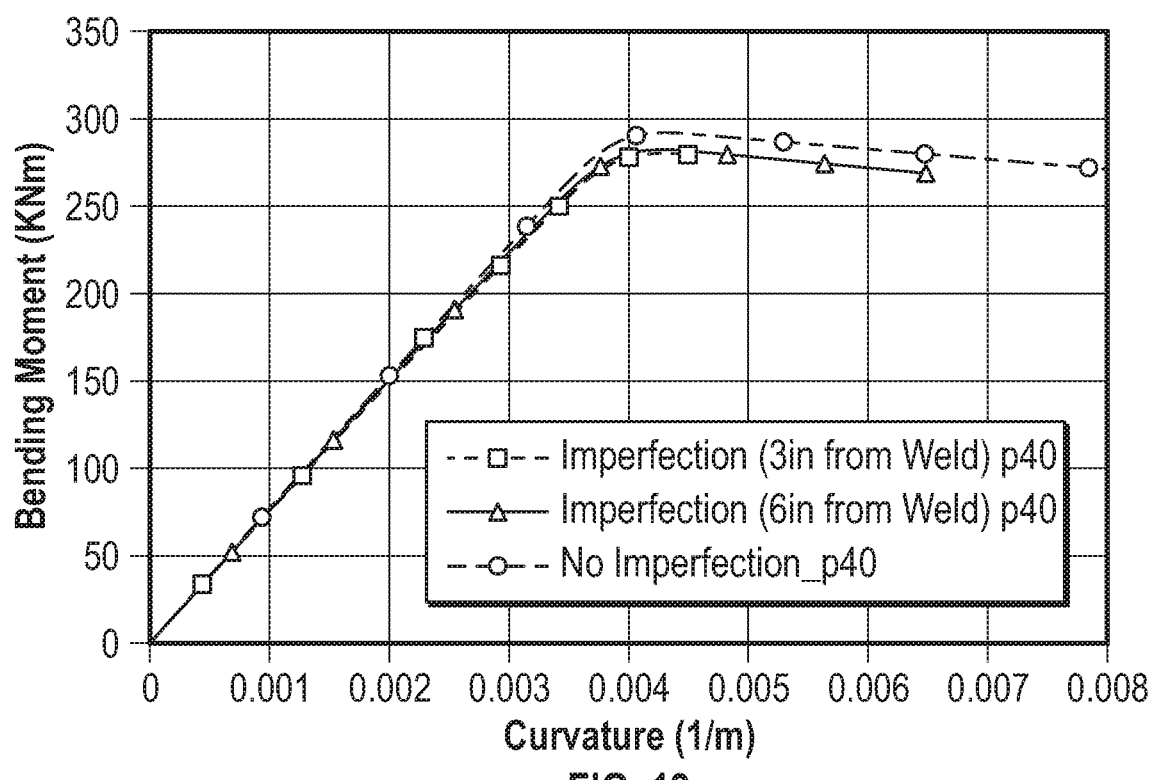
FIG. 19 is a graph illustrating the curvature of 0.135 inch thickness pipes with a deformation three inches from an exterior weld of a lap joint and six inches from the exterior weld, and a pipe without a deformation, when subjected to a bending moment at an internal pressure of 40% of the yield pressure.

Two reference points, located at each end of the model, were employed, which were coupled, in all six (6) degrees of freedom, in order to apply the desirable boundary conditions. In the case of pure bending, the rotation was induced at both far ends of the model as shown in FIG. 15. In the second case, for the case of compression, the axial displacement was induced at the end cross section of the bell side, while the end cross section of the spigot side remained fixed, as shown in FIG. 18.

5 SPIGOT IMPERFECTION/DEFORMATION SIZE

To define the amplitude of the spigot imperfection/deformation the following criterion was adopted: "the axial strains induced at the spigot due to the "imperfection/deformation" forming should be lower than the axial residual strains at the bell pipe.

After an extensive parametric study, for the thin pipe (0.135-inch thick) the optimum amplitude of spigot imperfection/deformation has been found equal to 83% of the pipe thickness. For the case of thick pipe (0.25-inch thick) the amplitude of imperfection/deformation at the spigot is equal to 72% of the pipe thickness.

6 NUMERICAL RESULTS

The results obtained from the numerical model refer to both axial load associated with axial deformation and to bending moment associated with pipe curvature. The "spigot imperfection" or deformation used in the analyses have the amplitude specified in the above section for the two pipe thicknesses. FIGS. 15A-16, 20A-20F, 22A-22D, 24A-24F, 26A-26D, 28A-28B, 30A-30B, and 32A-32D illustrate the results of finite element models of pipes and pipe joints including buckle-inducing deformations as described herein. Approximate stress values (MPa) at different locations of the pipes are represented by various dashed lines. The approximate stress values associated with the various dashed line types are given in legends accompanying the figures. In general, in axial loading and bending, the stress in the pipe walls increases in a direction toward the crests of the buckle-inducing deformations, and/or towards the bells of the pipes 14.

Figure 20A:
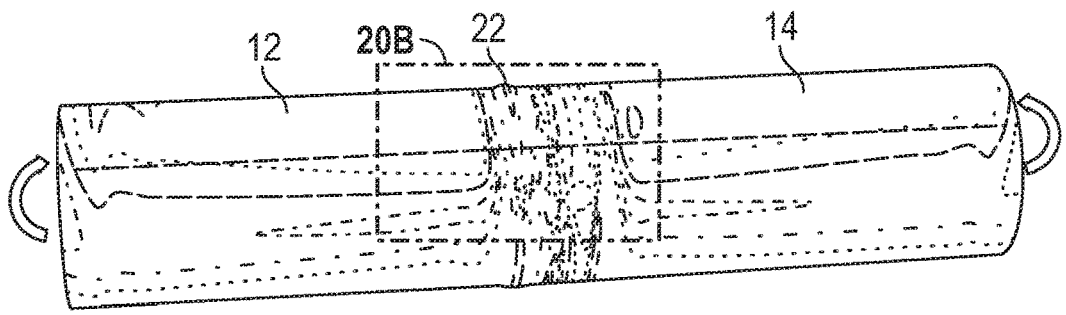
FIGS. 20A-20F are perspective views of numerical simulations of the pipes in FIG. 19 subjected to bending.
Figure 20B:
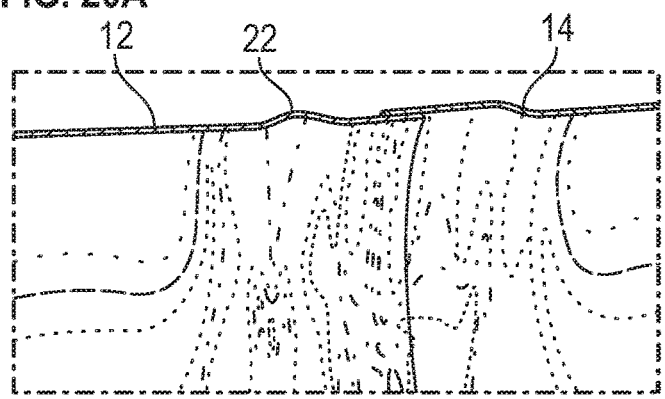
Figure 20C:
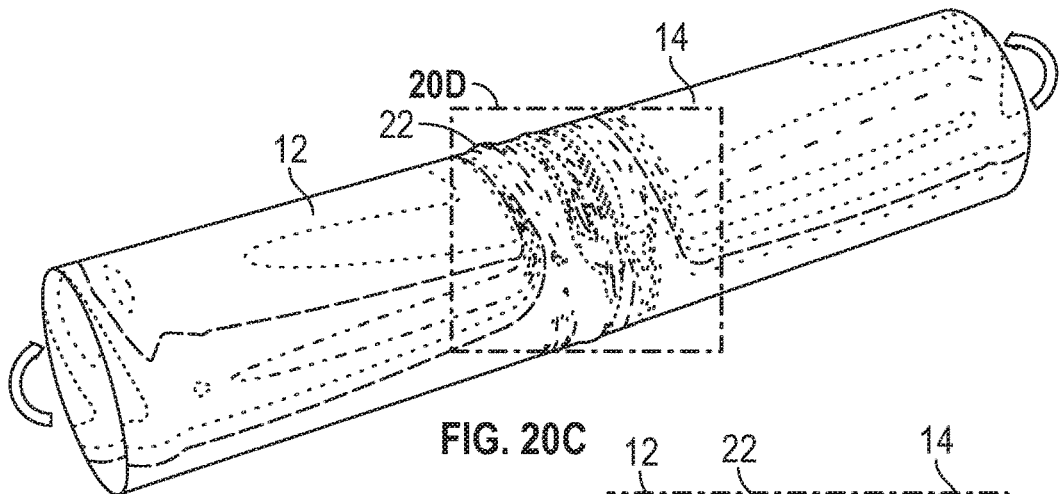
Figure 20D:
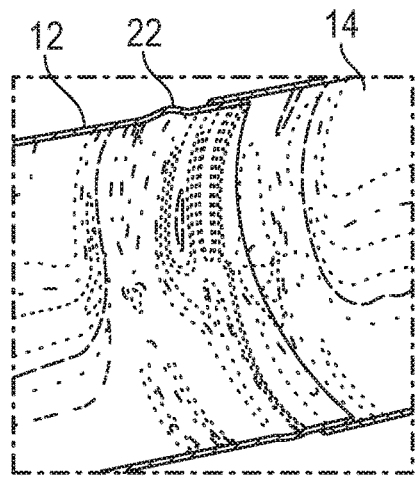
Figure 20E:
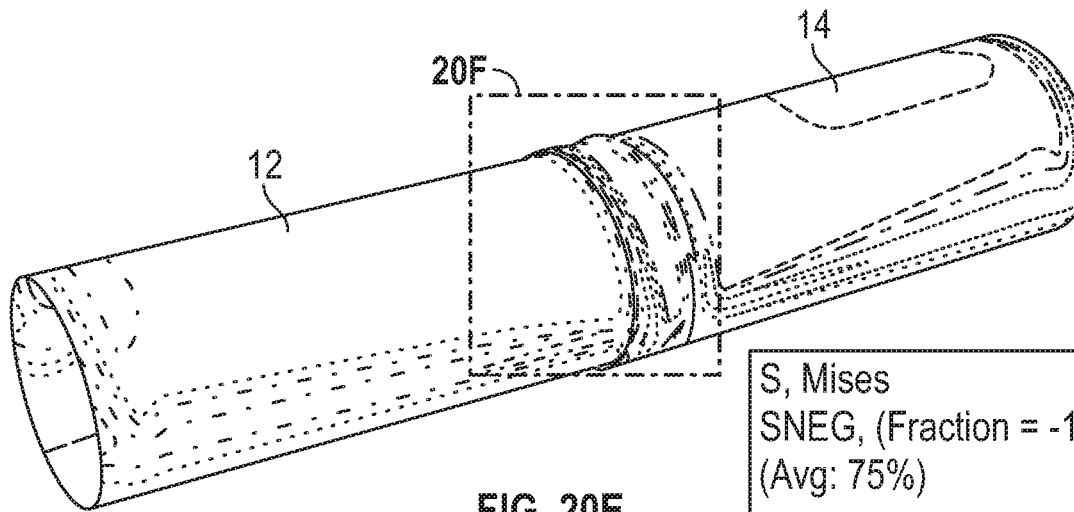
Figure 20F:
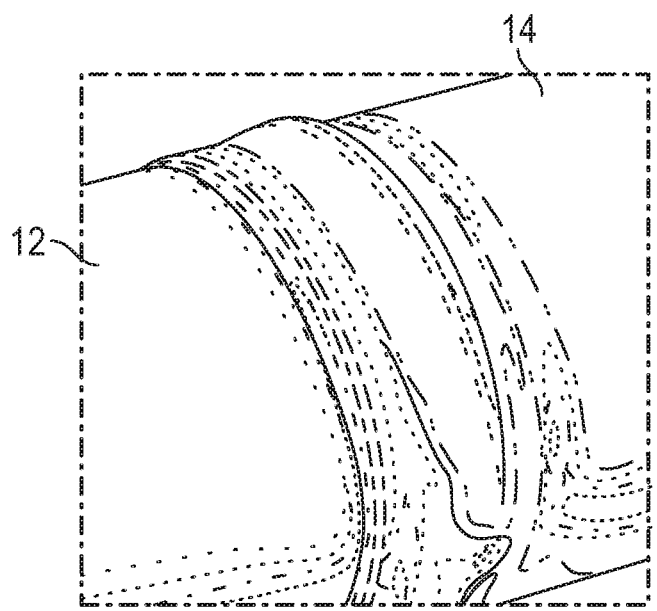
Figure 21:
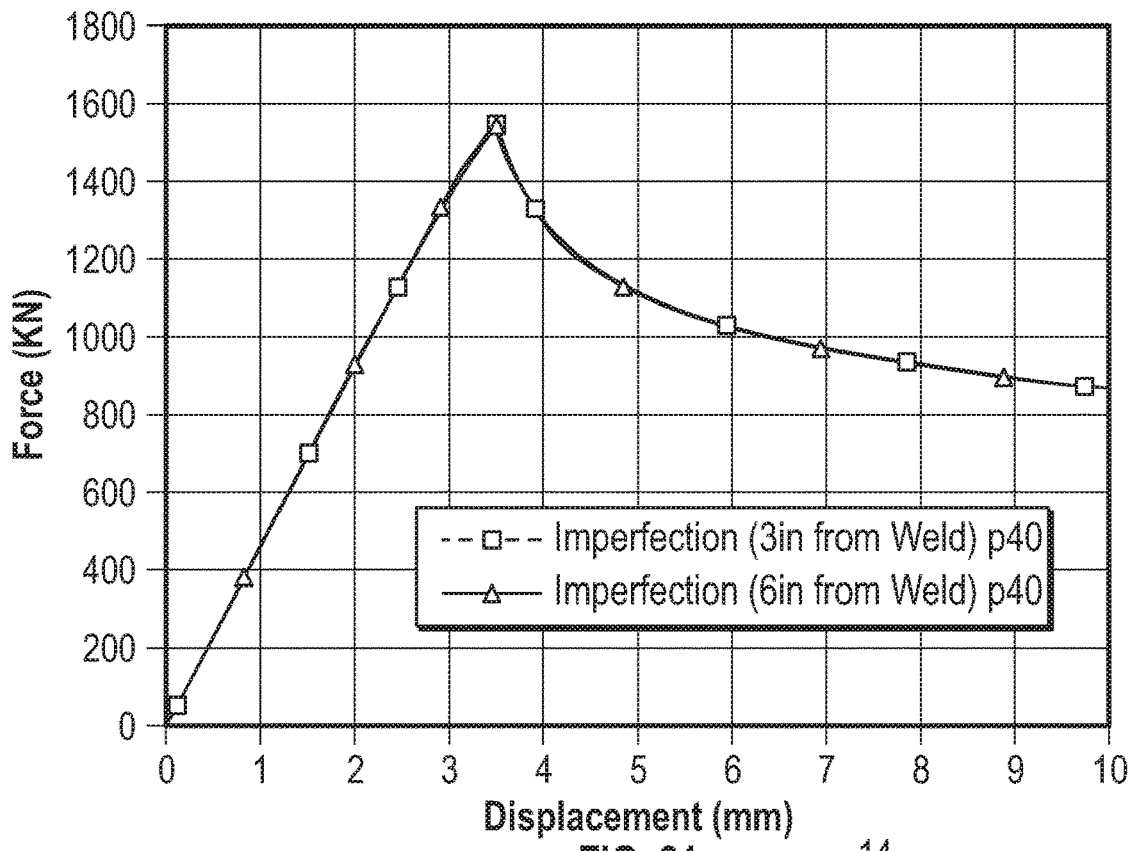
FIG. 21 is a graph illustrating displacement of a 0.135 inch thickness pipe with a deformation three inches from the exterior weld of a lap joint and a pipe with a deformation six inches from the exterior weld of a lap joint in axial compression.

FIGS. 19 and 20A-20F present the results from a pure bending analysis in the presence of internal pressure equal to 40% of the yield pressure and the corresponding buckling mode. Three cases are examined, assuming an "imperfection" or deformation at 3 inches from the outside weld, 6 inches from the outside weld and a lap joint without an imperfection or deformation at the spigot, in a pipe with a thickness of 0.135 inch. FIGS. 20A and 20B illustrate the pipe joint in bending with the deformation 3 inches from the outside weld. FIGS. 20C and 20D illustrate the pipe joint in bending with the deformation 6 inches from the outside weld, and FIGS. 20E and 20F illustrate a comparable pipe joint with no deformation. As can be seen in FIGS. 20E and 20F, without a deformation 22 formed in the first pipe 12, the second pipe 14 buckles at the bell.

Figure 22A:
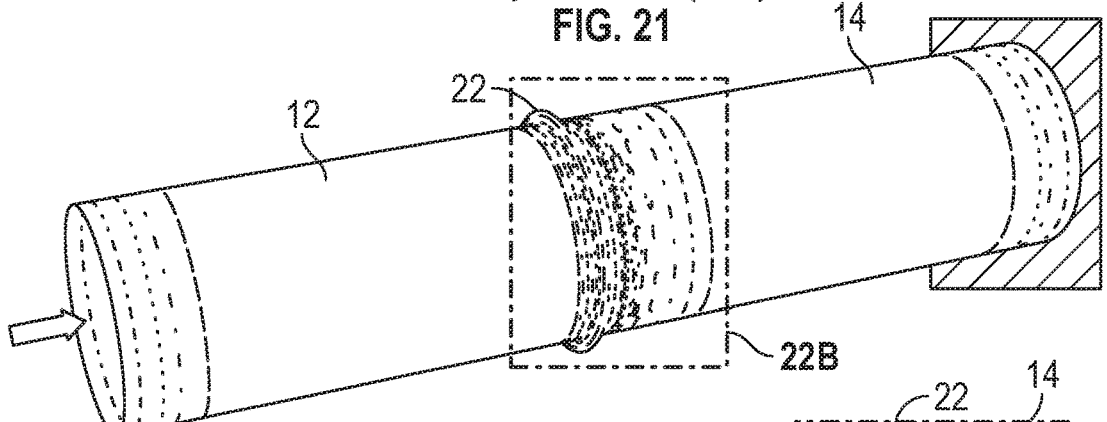
FIGS. 22A-22D are perspective views of numerical simulations of the pipes in FIG. 21 subjected to axial compression.
Figure 22B:
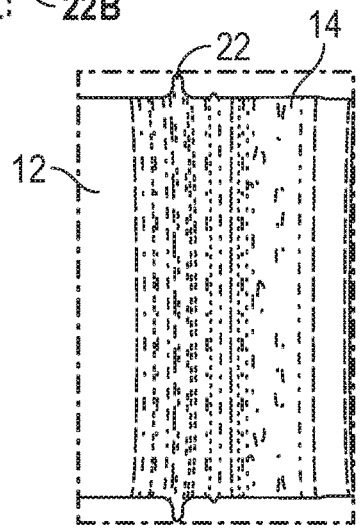
Figure 22C:
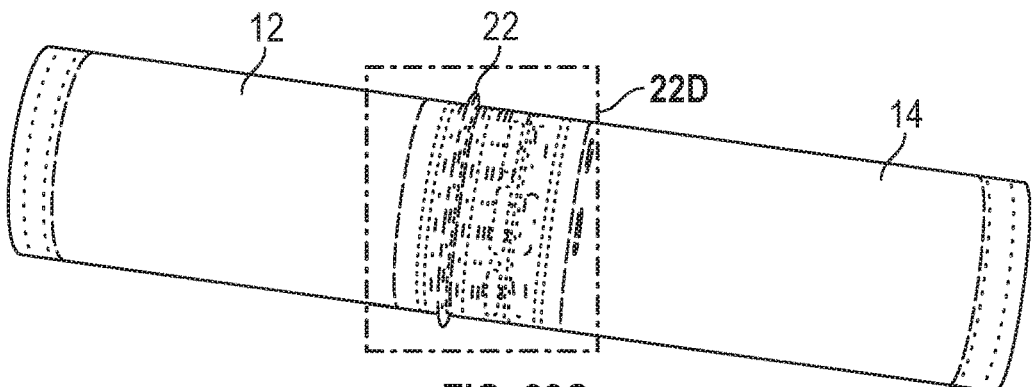
Figure 22D:
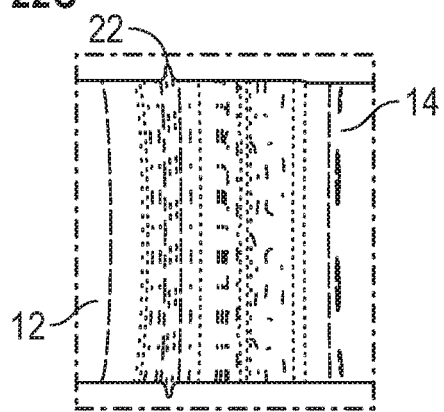
Figure 23:
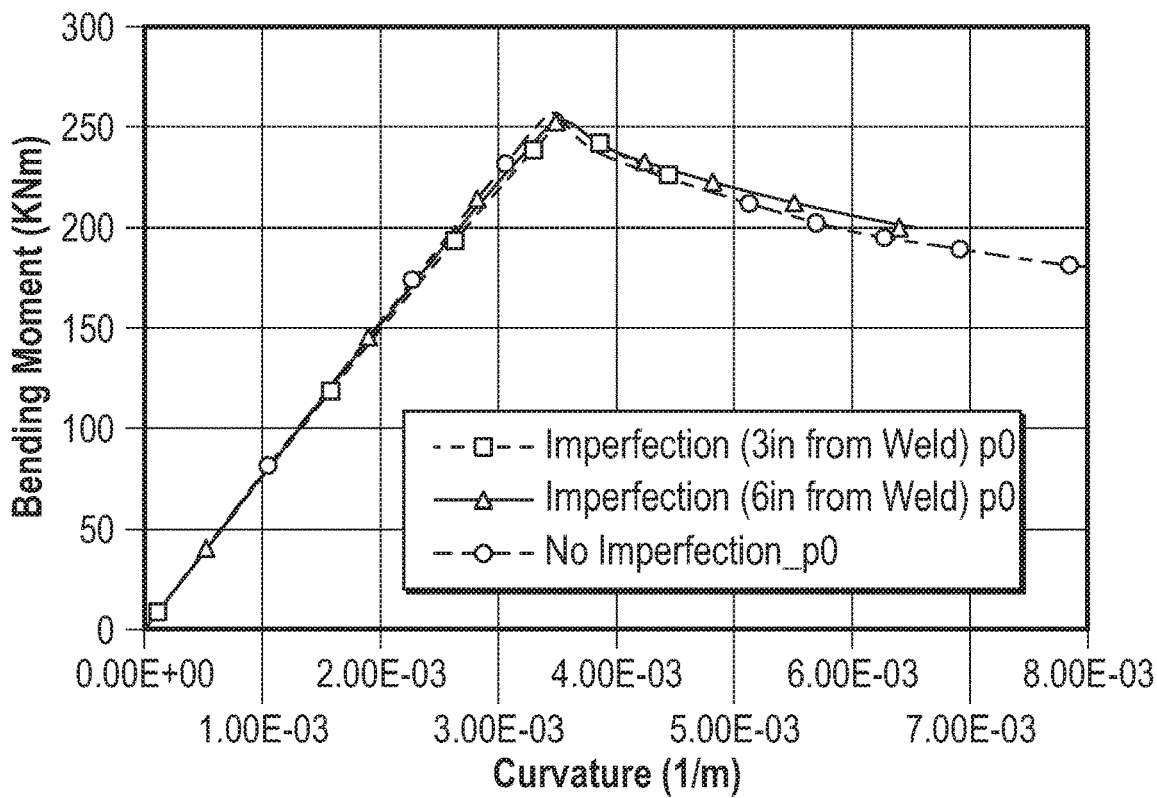
FIG. 23 is a graph illustrating the curvature of 0.135 inch thickness pipes with a deformation three inches from an exterior weld of a lap joint and six inches from the exterior weld, and a pipe without a deformation, when subjected to a bending moment without internal pressure.

FIGS. 21 and 22A-22D present the results from axial compression analysis in the presence of internal pressure equal to 40% of the yield pressure and the corresponding buckling modes. Two cases are examined, with imperfections/deformations at 3 inches and 6 inches from the outside weld, respectively. FIGS. 22A and 22B illustrate the pipe joint in axial compression with the deformation 3 inches from the outside weld, and FIGS. 22C and 22D illustrate the pipe joint with the deformation 6 inches from the outside weld.

FIGS. 23 and 24A-24F present results from a pure bending analysis without internal pressure and the corresponding buckling modes for a pipe having a thickness of 0.135 in. The position of the "spigot" imperfection/deformation is the same as in the case of bending in presence of internal pressure. FIGS. 24A and 24B illustrate the results with the deformation 22 three inches from the outside weld. FIGS. 24C and 24D illustrate the results with the deformation 22 six inches from the outside weld, and FIGS. 24E and 24F illustrate the results where the pipe 12 has no deformation. As shown in FIGS. 24E and 24F, without a deformation in the first pipe 12, the second pipe 14 buckles at the bell.

FIGS. 25 and 26A-26D show results from axial compression analysis without internal pressure and the corresponding buckling modes for a pipe with a thickness of 0.135 in. Two cases are considered for the position of the imperfection/deformation at the spigot pipe. The position of the imperfection/deformation is at three inches (FIGS. 26A and 26B) and six inches (FIGS. 26C and 26D) from the outside weld.

Figure 27:
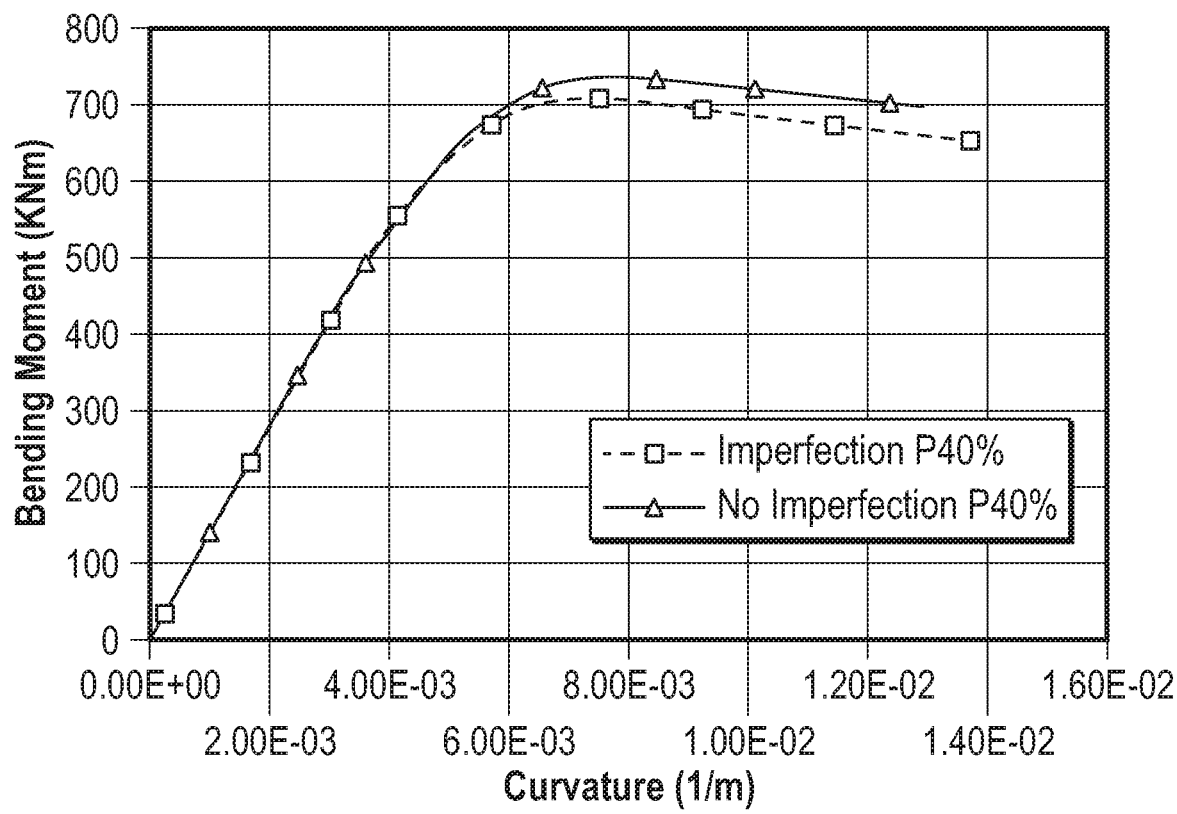
FIG. 27 is a graph illustrating the curvature of 0.25 inch thickness pipes with a deformation and without a deformation when subjected to a bending moment at an internal pressure of 40% of the yield pressure.
Figure 28A:
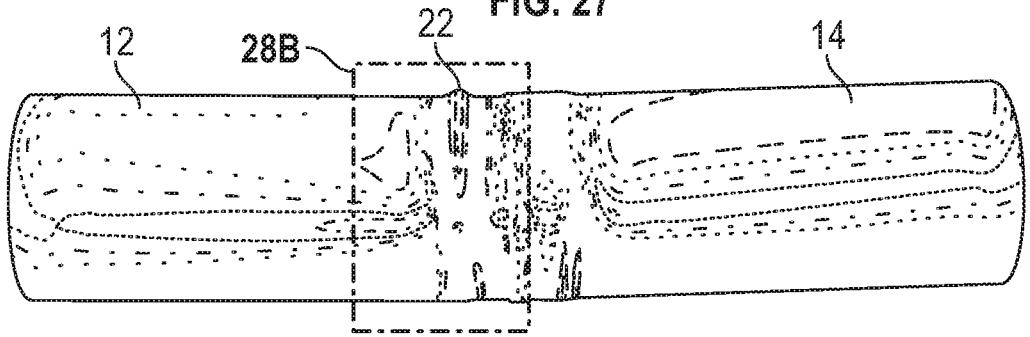
FIGS. 28A-28B are perspective views of numerical simulations of the pipe in FIG. 27 including a deformation subjected to bending.
Figure 28B:
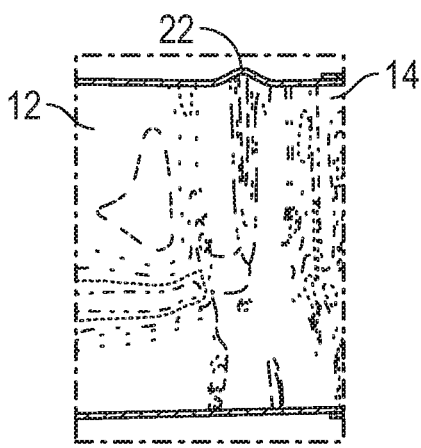

FIGS. 27 and 28A-28B present numerical simulation results for pure bending of a 0.25 inch thickness pipe with a deformation and without a deformation at an internal pressure of 40% of the yield pressure. In FIGS. 28A and 28B, the deformation 22 is located three inches from the outside weld.

Figure 29:
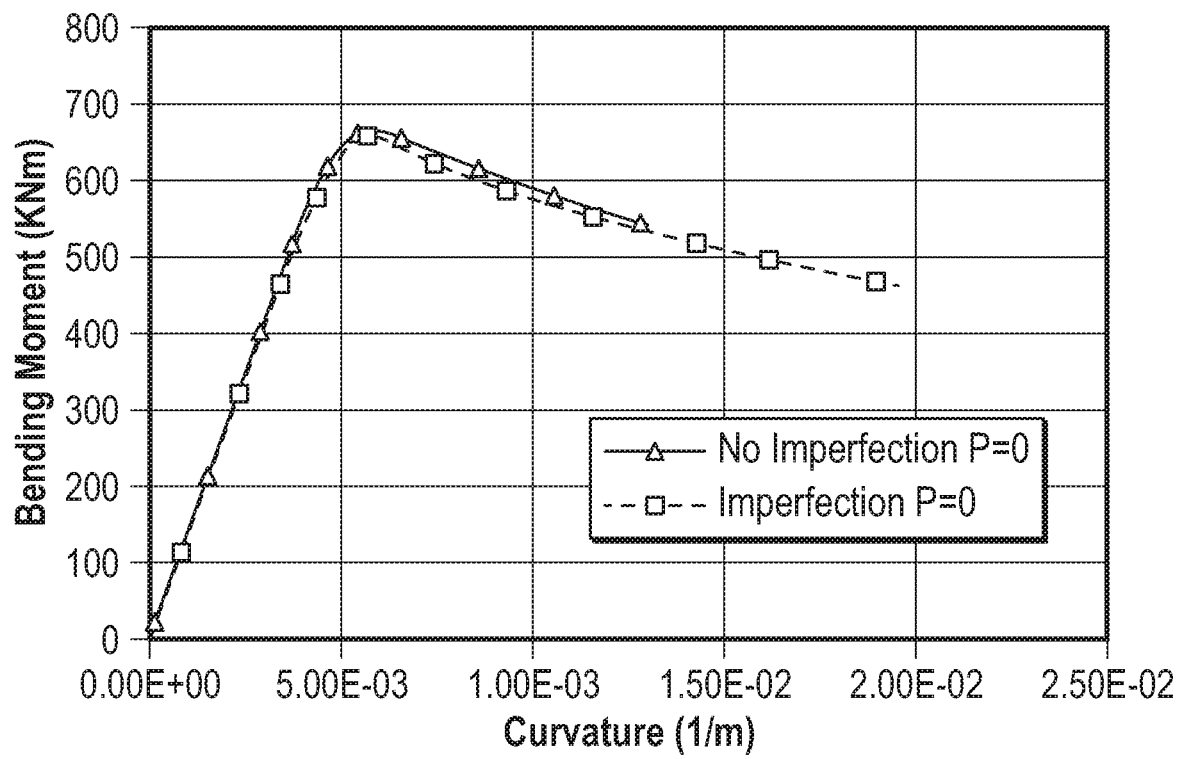
FIG. 29 is a graph illustrating the curvature of 0.25 inch thickness pipes with a deformation and without a deformation when subjected to a bending moment without internal pressure.
Figure 30A:
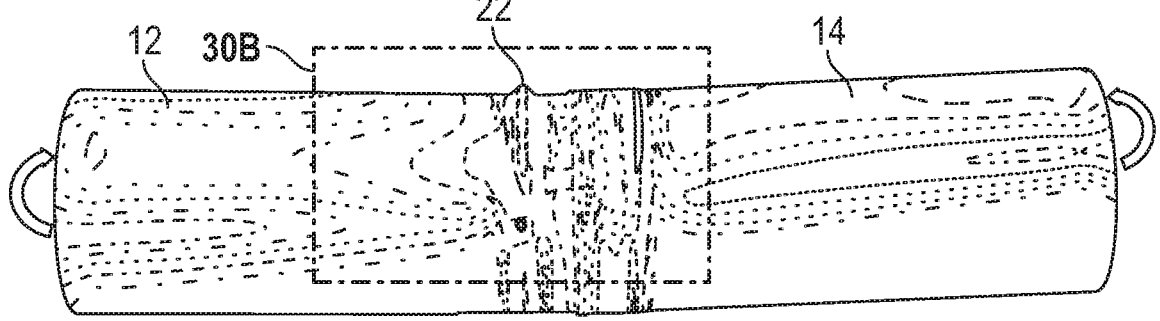
FIGS. 30A and 30B are perspective views of numerical simulations of the pipe in FIG. 29 with a deformation subjected to bending.
Figure 30B:
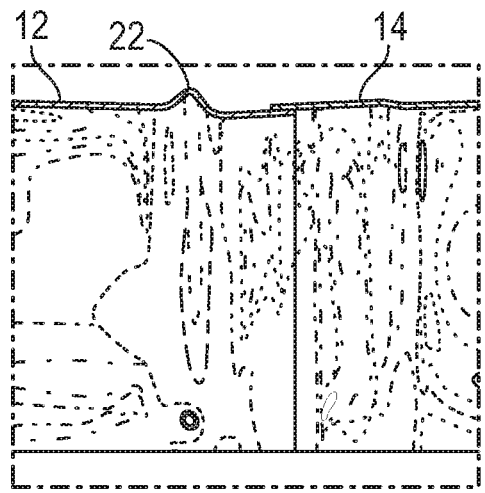
Figure 31:
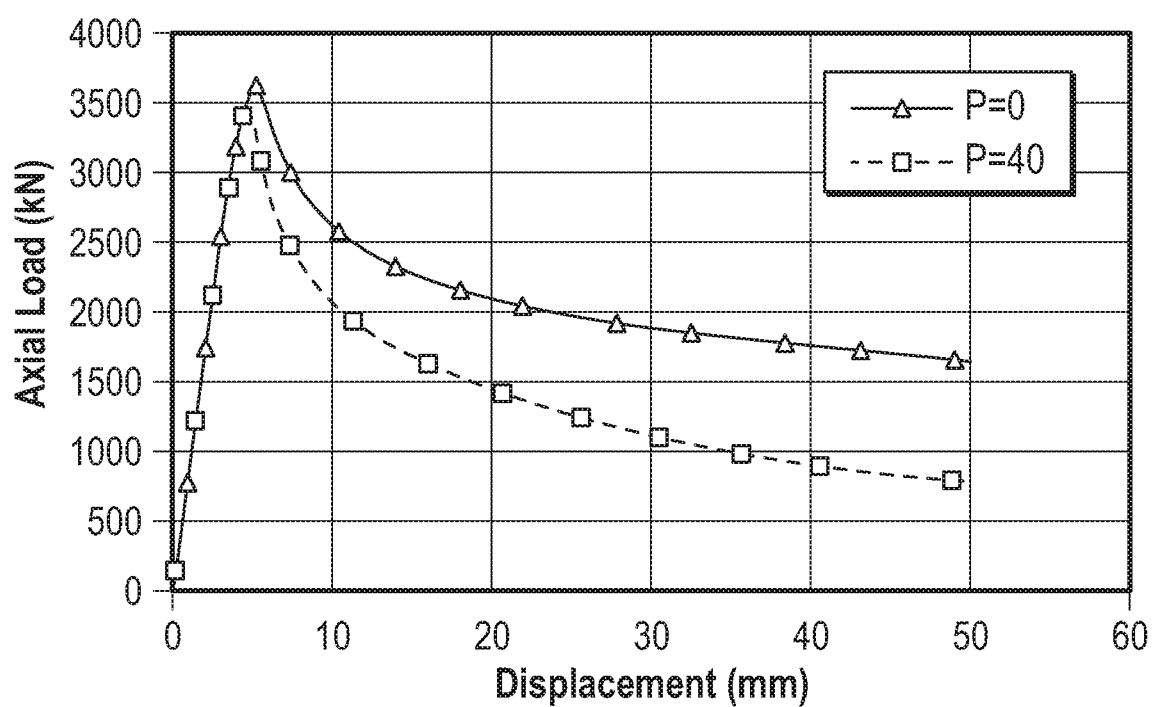
FIG. 31 is a graph illustrating displacement of a 0.25 inch thickness pipe with a deformation three inches from the exterior weld of a lap joint with and without internal pressure.

FIGS. 29 and 30A-30B present numerical simulation results for pure bending of a 0.25 inch thickness pipe with and without an initial deformation at the spigot, and without internal pressure. In FIGS. 30A and 30B, the deformation 22 is three inches from the outside weld.

Figure 32A:
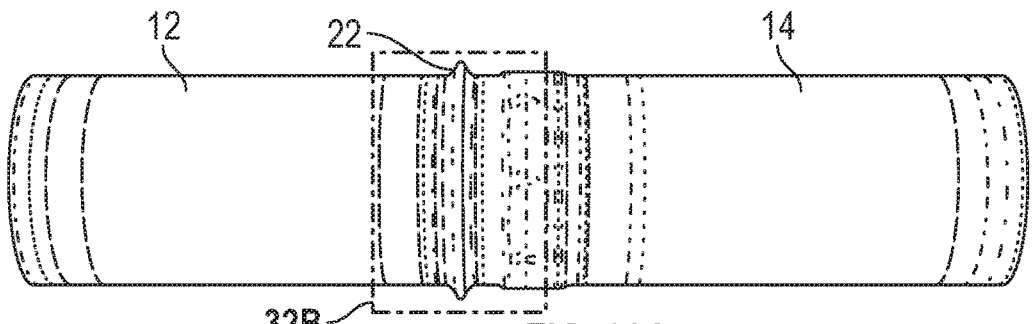
FIGS. 32A-32D are side views of numerical simulations of the pipes in FIG. 31 subjected to axial compression.
Figure 32B:
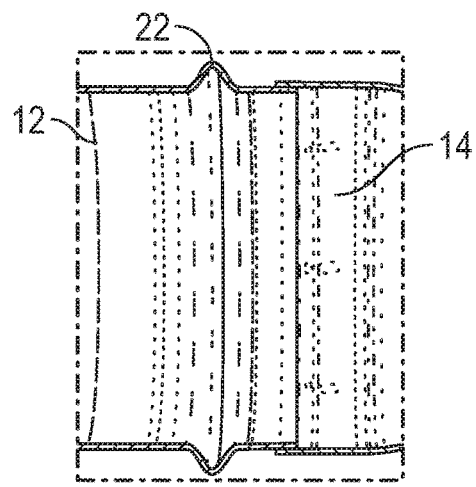
Figure 32C:
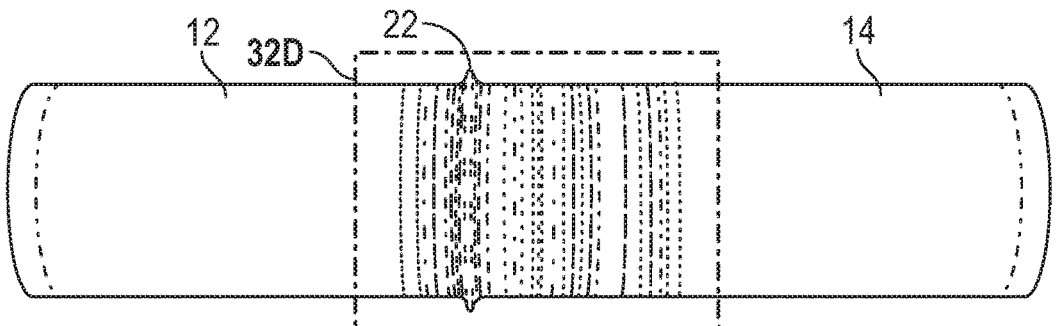
Figure 32D:
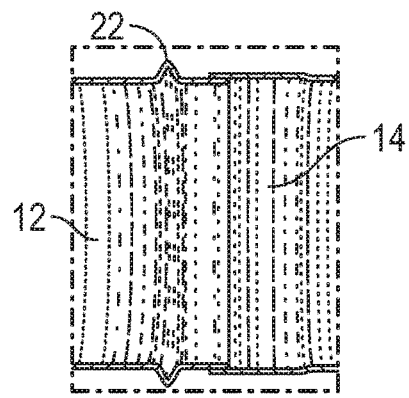

FIGS. 31 and 32A-32D present numerical simulation results for axial compression loading of a 0.25 inch thickness pipe with and without an internal pressure, and a deformation three inches from the outside weld. In FIGS. 32A and 32B, the internal pressure is 40% of the yield pressure, and in FIGS. 32C and 32D there is no internal pressure in the pipes.

7 CONCLUSIONS

The results above show that a size range of this imperfection/deformation exists which can ensure that buckling occurs at the spigot and the structural performance of the welded lap-joint is not affected. Based on the present analysis, in certain embodiments the size range of this imperfection/deformation can be between 80-100% of the pipe wall thickness. In practice, this imperfection/deformation can be imposed through a special wire around an expansion mandrel, and its size can be close to the pipe wall thickness.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

Although there are alternatives for various components, parameters, operating conditions, etc., set forth herein, that does not mean that those alternatives are necessarily equivalent and/or perform equally well. Nor does it mean that the alternatives are listed in a preferred order unless stated otherwise.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. We therefore claim all that comes within the scope and spirit of these claims.

The invention claimed is:

1. A pipe joint, comprising:
a first pipe comprising a main body having a first diameter, an end portion configured as a pipe spigot end portion, and a first pipe wall thickness, the first pipe comprising a metallic material and the pipe spigot end portion of the first pipe comprising a single layer of metallic material;
a second pipe comprising a main body having the first diameter and an end portion configured as a pipe bell end portion, the pipe bell end portion including a second diameter portion having a second diameter that is greater than the first diameter and a transition portion between the main body and the second diameter portion in which the second pipe transitions from the first diameter to the second diameter, the second pipe comprising a metallic material and the pipe bell end portion of the second pipe comprising a single layer of metallic material;
the pipe spigot end portion of the first pipe being inserted into the pipe bell end portion of the second pipe and welded to the pipe bell end portion of the second pipe to form the pipe joint;
the first pipe comprising an outwardly-extending, buckle-inducing deformation that is formed in the pipe spigot end portion and spaced apart from the pipe bell end portion of the second pipe;
wherein a crest height of the buckle-inducing deformation is 50% to 500% of the first pipe wall thickness;
wherein a contour of the buckle-inducing deformation is curved from a crest of the buckle-inducing deformation to a portion of the main body of the first pipe having the first diameter;
wherein the pipe bell end portion of the second pipe transitions from the second diameter to the first diameter in the transition portion and is free of a buckle-inducing deformation;
the pipe joint further comprising an internal fillet weld joining the pipe spigot end portion of the first pipe to an interior surface of the second diameter portion of the second pipe;
the pipe joint further comprising an external fillet weld joining the pipe bell end portion of the second pipe to an exterior surface of the first pipe; and
wherein the internal fillet weld is located in the second diameter portion of the second pipe and spaced apart from the transition portion of the second pipe in an upstream direction.

2. The pipe joint according to claim 1, wherein the buckle-inducing deformation comprises an annular bulge formed in the exterior surface of the first pipe and an annular recess formed in an interior surface of the first pipe at the location of the annular bulge.

3. The pipe joint according to claim 1, wherein:
the first pipe has a longitudinal axis; and
the buckle-inducing deformation is axially spaced from the pipe joint by 2 inches to 36 inches along the first pipe.

4. The pipe joint according to claim 1, wherein the crest height of the buckle-inducing deformation is from 50% to 300% of the first pipe wall thickness.

5. The pipe joint according to claim 1, wherein the crest height is from 70% to 100% of the first pipe wall thickness.

6. The pipe joint according to claim 1, wherein:
the first pipe wall thickness is 0.135 inch and the crest height is 80% to 90% of the first pipe wall thickness; or
the first pipe wall thickness is 0.25 inch and the crest height is 70% to 80% of the first pipe wall thickness.

7. The pipe joint according to claim 1, wherein a crest of the buckle-inducing deformation does not extend beyond a height of an exterior surface of the second diameter portion of the second pipe.

8. The pipe joint according to claim 1, wherein the buckle-inducing deformation of the first pipe is one of a plurality of buckle-inducing deformations formed in the first pipe and spaced apart from each other along a longitudinal axis of the first pipe.

9. The pipe joint according to claim 1, wherein the buckle-inducing deformation is formed by:
positioning the first pipe over a plurality of dies of an expander apparatus, the first pipe being at ambient temperature, each of the plurality of dies comprising a flange and a curved rod member coupled to a radially outward surface of the flange; and
moving the dies radially outwardly from a central axis of the expander apparatus such that the rod members of the dies are pressed into an interior surface of the first pipe to form the buckle-inducing deformation in the first pipe.

10. The pipe joint according to claim 1, wherein the buckle-inducing deformation is formed by:
positioning the first pipe between a first die and a second die of a grooving machine, the first pipe being at ambient temperature, the first die comprising a groove and the second die comprising a forming member;
pressing the first pipe between the first die and the second die; and
rotating the first pipe such that the forming member forms the buckle-inducing deformation in the first pipe.

11. The pipe joint of claim 1, wherein the transition portion of the second pipe has a downstream end where the diameter of the second pipe begins to increase from the first diameter and an upstream end where the second pipe reaches the second diameter, and the internal fillet weld is spaced apart from the upstream end of the transition portion in an upstream direction and is located in the second diameter portion of the second pipe.

12. The pipe joint of claim 1, wherein the buckle-inducing deformation is axially spaced apart from the second pipe by 2 inches to 10 inches along the first pipe.

13. A system, comprising:
a first pipe comprising a main body having a first diameter and a pipe spigot end portion, the first pipe comprising a first pipe wall thickness, the first pipe comprising a metallic material, and the pipe spigot end portion of the first pipe comprising a single layer of metallic material; and
a second pipe comprising a main body having the first diameter and a pipe bell end portion having a second diameter that is greater than the first diameter, the pipe bell end portion being configured to receive the pipe spigot end portion of the first pipe, the second pipe comprising a metallic material and the pipe bell end portion of the second pipe comprising a single layer of metallic material;

wherein the first pipe comprises an outwardly-extending, buckle-inducing deformation that is formed in the pipe spigot end portion and spaced apart from an end of the pipe spigot end portion of the first pipe such that when the first pipe is welded to the second pipe, the buckle-inducing deformation is offset from the weld between the first pipe and the second pipe and offset from the pipe bell end portion of the second pipe; and wherein a crest height of the buckle-inducing deformation is 50% to 500% of the first pipe wall thickness;

wherein a contour of the buckle-inducing deformation is curved from a crest of the buckle-inducing deformation to a portion of the main body of the first pipe having the first diameter;

wherein the pipe bell end portion of the second pipe transitions from the second diameter to the first diameter and is free of a buckle-inducing deformation, and the first diameter continues along the main body of the second pipe away from the pipe bell end portion of the second pipe; and wherein the buckle-inducing deformation is spaced from the end of the pipe spigot end portion of the first pipe by 2 inches to 10 inches along the first pipe.

14. The system of claim 13, wherein the buckle-inducing deformation is spaced apart from the end of the pipe spigot end portion of the first pipe such that when the pipe spigot end portion of the first pipe is received in the pipe bell end portion of the second pipe, the buckle-inducing deformation is offset from the pipe bell end portion of the second pipe.

15. The system of claim 14, wherein the crest height of the buckle-inducing deformation is from 70% to 100% of the first pipe wall thickness.

16. The system of claim 15, wherein:
the first pipe wall thickness is 0.135 inch and the crest height of the buckle-inducing deformation is 80% to 90% of the first pipe wall thickness; or
the first pipe wall thickness is 0.25 inch and the crest height of the buckle-inducing deformation is 70% to 80% of the first pipe wall thickness.

17. A pipe joint, comprising:
a first pipe comprising a main body having a first diameter, a first pipe wall thickness, and an end portion configured as a pipe spigot end portion, the first pipe comprising a metallic material and the end portion of the first pipe comprising a single layer of metallic material;

a second pipe comprising a main body having the first diameter and an end portion configured as a pipe bell end portion, the pipe bell end portion having a second diameter that is greater than the first diameter, the second pipe comprising a metallic material and the pipe bell end portion of the second pipe comprising a single layer of metallic material;

the pipe spigot end portion being inserted into the pipe bell end portion and welded to the pipe bell end portion to seal the joint between the pipe spigot end portion and the pipe bell end portion;

the first pipe comprising an outwardly-extending, buckle-inducing deformation that is spaced apart from the pipe bell end portion of the second pipe; and wherein a crest height of the buckle-inducing deformation is 50% to 500% of the first pipe wall thickness;

wherein a contour of the buckle-inducing deformation is curved from a crest of the buckle-inducing deformation to a portion of the main body of the first pipe having the first diameter;

wherein the pipe bell end portion of the second pipe transitions from the second diameter to the first diameter and is free of a buckle-inducing deformation, and the first diameter continues along the main body of the second pipe away from the pipe bell end portion of the second pipe;

the pipe joint further comprising an external fillet weld joining the pipe bell end portion of the second pipe to an exterior surface of the first pipe;

the pipe joint further comprises an internal fillet weld joining the pipe spigot end portion of the first pipe to an interior surface of the pipe bell end portion of the second pipe having the second diameter; and wherein the buckle-inducing deformation is axially spaced apart from the second pipe by 2 inches to 10 inches along the first pipe.

18. The pipe joint of claim 17, wherein:
the pipe bell end portion of the second pipe comprises a transition portion between the main body of the second pipe and a second diameter portion of the pipe bell end portion in which the diameter of the second pipe increases from the first diameter to the second diameter; and the internal fillet weld is spaced apart from the transition portion of the second pipe in an upstream direction and is located in the second diameter portion of the second pipe.

* * * * *

UNITED STATES PATENT AND TRADEMARK OFFICE
CERTIFICATE OF CORRECTION

| | | |
|---|---|---|
| PATENT NO. | : 12,215,817 B2 | Page 1 of 1 |
| APPLICATION NO. | : 16/865228 | |
| DATED | : February 4, 2025 | |
| INVENTOR(S) | : Keil et al. | |

It is certified that error appears in the above-identified patent and that said Letters Patent is hereby corrected as shown below:

In the Claims

Column 20, Line 4 of Claim 3, "the pipe joint by 2 inches to 36inches" should read -- the pipe joint by 2 inches to 36 inches --

Signed and Sealed this
Nineteenth Day of August, 2025

Coke Morgan Stewart
*Acting Director of the United States Patent and Trademark Office*